United States Patent
Yuan

(10) Patent No.: US 12,493,056 B2
(45) Date of Patent: Dec. 9, 2025

(54) CURRENT DETECTION APPARATUS AND CURRENT DETECTION METHOD

(71) Applicant: SUZHOU NOVOSENSE MICROELECTRONICS CO., LTD., Jiangsu (CN)

(72) Inventor: Fute Yuan, Jiangsu (CN)

(73) Assignee: Suzhou Novosense Microelectronics Co., Ltd., Jiangsu (CN)

( * ) Notice: Subject to any disclaimer, the term of this patent is extended or adjusted under 35 U.S.C. 154(b) by 196 days.

(21) Appl. No.: 18/446,282

(22) Filed: Aug. 8, 2023

(65) Prior Publication Data

US 2024/0044944 A1 Feb. 8, 2024

(30) Foreign Application Priority Data

Aug. 8, 2022 (CN) .......................... 202210943535.7

(51) Int. Cl.
*G01R 15/20* (2006.01)
(52) U.S. Cl.
CPC .................................. *G01R 15/202* (2013.01)
(58) Field of Classification Search
CPC ..... G01R 5/202; G01R 33/072; G01R 15/207
See application file for complete search history.

(56) References Cited

U.S. PATENT DOCUMENTS

| | | | |
|---|---|---|---|
| 2005/0185346 | A1 | 8/2005 | Shoji |
| 2012/0212217 | A1* | 8/2012 | Engel ................. G01R 33/0023 324/252 |
| 2015/0338444 | A1* | 11/2015 | Ivanov ................ G01R 15/207 324/117 R |
| 2020/0256934 | A1* | 8/2020 | Saruki ................ G01R 33/0017 |

FOREIGN PATENT DOCUMENTS

CN 106443515 A 2/2017

OTHER PUBLICATIONS

1 Notice of Grant dated May 21, 2024 from corresponding Chinese Application No. 202210943535.7.

* cited by examiner

*Primary Examiner* — Dominic E Hawkins
(74) *Attorney, Agent, or Firm* — ArentFox Schiff LLP

(57) ABSTRACT

A current detection apparatus having a substrate, at least one magnetic sensor arranged on the substrate, and a processing circuit. The magnetic sensor includes a first sensing portion and a second sensing portion which are different in a direction of a magnetic field component of the first signal magnetic field. The magnetic sensor is configured to generate a sensing electrical signal according to the first signal magnetic field. The processing circuit is connected to the magnetic sensor and is configured to determine, according to the sensing electrical signal, a value of the current flowing through the conductor.

13 Claims, 13 Drawing Sheets

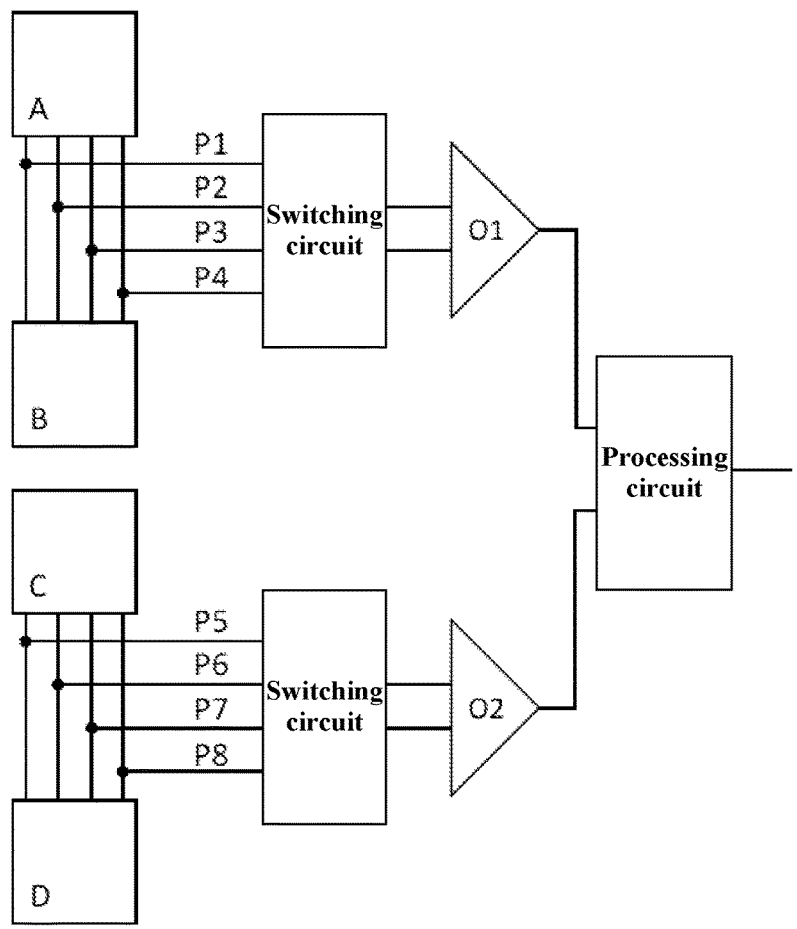

FIG. 24

Arrange a conductor in a preset detection area corresponding to a current detection apparatus, where a first signal magnetic field is generated when a to-be-measured current passes through the conductor — S2501

A magnetic sensor generates a sensing electrical signal according to the first signal magnetic field generated, where the magnetic sensor has no signal output for a second magnetic field, and the second magnetic field includes a uniform magnetic field outside the conductor — S2502

A processing module determines, according to the sensing electrical signal, a value of the to-be-measured current flowing through the conductor — S2503

FIG. 25

CURRENT DETECTION APPARATUS AND CURRENT DETECTION METHOD

CROSS-REFERENCES TO RELATED APPLICATION(S)

This application claims the priority to Chinese Patent Application No. CN202210943535.7, filed on Aug. 8, 2022, the disclosure of which is incorporated herein by reference in its entirety.

TECHNICAL FIELD

The present disclosure relates to the technical field of detection and, in particular, to a current detection apparatus and a current detection method.

BACKGROUND

Current measurement plays an important role in many application fields such as motor servo control, circuit protection, power control and temperature adjustment. A traditional contact current measurement method is as follows: a resistor is connected in parallel on a current-carrying wire; a sampling circuit is arranged at two ends of the resistor to obtain the voltage across the resistor, and then a current value is calculated and finally output through an isolation chip. However, the traditional contact current measurement has the problems of complex overall device framework and high cost.

The cost of detecting current by a magnetic sensing method is low. When the existing magnetic sensor is used to detect the current, the detection accuracy of the magnetic sensor is affected by the interference of an environmental magnetic field.

SUMMARY

The present disclosure provides a current detection apparatus and a current detection method.

In an embodiment, a current detection apparatus is provided. A conductor is configured in a preset detection area corresponding to the current detection apparatus; and a first signal magnetic field is generated when a current passes through the conductor.

The current detection apparatus includes a substrate, at least one magnetic sensor arranged on the substrate, and a processing circuit.

The magnetic sensor includes a first sensing portion and a second sensing portion, and the first sensing portion and the second sensing portion are different in a direction of a magnetic field component of the first signal magnetic field.

The magnetic sensor is configured to generate a sensing electrical signal according to the first signal magnetic field.

The processing circuit is connected to the magnetic sensor and is configured to determine, according to the sensing electrical signal, a value of the current flowing through the conductor.

In one embodiment, the substrate has a first surface facing the conductor and a second surface facing away from the conductor.

The substrate includes a first position and a second position which are spaced apart on the first surface or the second surface.

The first sensing portion is arranged at the first position; the second sensing portion is arranged at the second position.

The magnetic sensor senses the first signal magnetic field generated when the current passes through the conductor.

A direction of the first signal magnetic field at the first position is different from a direction of the first signal magnetic field at the second position.

Strength of the first signal magnetic field at the first position is different from strength of the first signal magnetic field at the second position.

The magnetic sensor generates the sensing electrical signal according to a difference between magnetic field strength of a component of the first signal magnetic field in a preset direction at the first position and magnetic field strength of a component of the first signal magnetic field in the preset direction at the second position.

In an embodiment, the conductor at least partially overlaps an orthographic projection of the first sensing portion on the conductor and/or an orthographic projection of the second sensing portion on the conductor.

Alternatively, the conductor does not overlap an orthographic projection of the first sensing portion on the conductor or an orthographic projection of the second sensing portion on the conductor.

In an embodiment, along an extension direction of the first sensing portion pointing to the second sensing portion, the magnetic sensor crosses an extension direction of the conductor.

In an embodiment, along the extension direction of the first sensing portion pointing to the second sensing portion, the magnetic sensor is perpendicular to the extension direction of the conductor.

In an embodiment, the magnetic sensor further includes a plurality of first connection lines and a plurality of output terminals.

The first sensing portion and the second sensing portion are connected in parallel through the plurality of first connection lines, and each of the plurality of first connection lines is connected to one of the output terminals.

In an embodiment, the plurality of output terminals of the magnetic sensor includes a first output terminal and a second output terminal.

The first output terminal is configured to output a first sensing electrical signal of the magnetic sensor.

The second output terminal is configured to output a second sensing electrical signal of the magnetic sensor.

Under the first signal magnetic field, the first sensing electrical signal and the second sensing electrical signal have different amplitude variations and phase variations.

In an embodiment, the plurality of output terminals of the magnetic sensor further includes a first drive terminal and a second drive terminal.

The first drive terminal is configured to be connected to a power supply and the second drive terminal is configured to be grounded; or, the first drive terminal is configured to be grounded and the second drive terminal is configured to be connected to a power supply.

The first sensing portion includes a first contact, a second contact, a third contact and a fourth contact.

The second sensing portion includes a fifth contact, a sixth contact, a seventh contact and an eighth contact.

The first contact and the fifth contact are connected as the first drive terminal.

The second contact and the eighth contact are connected as the second output terminal.

The third contact and the seventh contact are connected as the second drive terminal.

The fourth contact and the sixth contact are connected as the first output terminal.

In an embodiment, the first sensing portion includes at least two Hall cells.

The at least two Hall cells are connected to each other.

The at least two Hall cells of the first sensing portion are configured as described below.

In a same drive current direction, a positive electrode of a Hall voltage output terminal of an odd-numbered Hall cell and a negative electrode of a Hall voltage output terminal of an even-numbered Hall cell are connected as the second contact; and a negative electrode of the Hall voltage output terminal of the odd-numbered Hall cell and a positive electrode of the Hall voltage output terminal of the even-numbered Hall cell are connected as the fourth contact.

The number of Hall cells is an even number.

In an embodiment, the second sensing portion and the first sensing portion are of a same structure.

Hall cells of the second sensing portion are configured as described below.

In a same drive current direction, a positive electrode of a Hall voltage output terminal of an odd-numbered Hall cell and a negative electrode of a Hall voltage output terminal of an even-numbered Hall cell are connected as the seventh contact; and a negative electrode of the Hall voltage output terminal of the odd-numbered Hall cell and a positive electrode of the Hall voltage output terminal of the even-numbered Hall cell are connected as the fifth contact.

In an embodiment, the first sensing portion and the second sensing portion are of the same structure.

The first sensing portion includes a first Hall cell and a second Hall cell.

The first Hall cell includes a first electrode, a second electrode, a third electrode and a fourth electrode.

The second Hall cell includes a fifth electrode, a sixth electrode, a seventh electrode and an eighth electrode.

The first electrode and the sixth electrode are electrically connected to the first contact, the second electrode and the seventh electrode are connected to the second contact, the third electrode and the eighth electrode are connected to the third contact, and the fourth electrode and the fifth electrode are connected to the fourth contact.

The second electrode and the fifth electrode are positive electrodes of Hall voltage output terminals; and the fourth electrode and the seventh electrode are negative electrodes of Hall voltage output terminals.

In an embodiment, the current detection apparatus further includes at least one switching circuit arranged on the substrate.

A switching circuit of the at least one switching circuit is electrically connected to the plurality of output terminals of the magnetic sensor, is configured to switch a connection mode of the plurality of output terminals of the magnetic sensor so as to adjust a working state of the magnetic sensor, and is configured to sequentially drive the magnetic sensor to output the first sensing electrical signal and the second sensing electrical signal under the first signal magnetic field.

In an embodiment, the at least one magnetic sensor is arranged in one-to-one correspondence with the at least one switching circuit.

In an embodiment, the current detection apparatus further includes an amplifying module.

The amplifying module is connected between the switching circuit and the processing circuit and is configured to receive the first sensing electrical signal and the second sensing electrical signal, perform differential amplification on the first sensing electrical signal and the second sensing electrical signal, and output the amplified sensing electrical signals to the processing circuit.

In an embodiment, a sensitive direction of the magnetic sensor is parallel to a plane where the substrate is disposed.

Alternatively, a sensitive direction of the magnetic sensor is perpendicular to a plane where the substrate is disposed.

In another embodiment, a current detection method is provided and applied to any current detection apparatus provided above. The current detection apparatus includes a substrate, at least one magnetic sensor arranged on the substrate, and a processing circuit. The processing circuit is connected to the at least one magnetic sensor. The magnetic sensor includes a first sensing portion and a second sensing portion. The first sensing portion and the second sensing portion are different in a direction of a magnetic field component of a first signal magnetic field which is generated when a current passes through a conductor in a preset detection area corresponding to the current detection apparatus.

The current detection method includes the steps described below.

The magnetic sensor generates a sensing electrical signal according to the first signal magnetic field.

The processing circuit determines, according to the sensing electrical signal, a value of the current flowing through the conductor.

It is to be understood that the content described in this part is neither intended to identify key or important features of embodiments of the present disclosure nor intended to limit the scope of the present disclosure. Other features of the present disclosure are apparent from the description provided hereinafter.

BRIEF DESCRIPTION OF DRAWINGS

To illustrate technical solutions in embodiments of the present disclosure more clearly, the drawings used in description of the embodiments are described below. Apparently, the drawings described below merely illustrate part of the embodiments of the present disclosure, and those of ordinary skill in the art may obtain other drawings based on the drawings described below.

FIG. 24 is a structural view of another current detection apparatus according to an embodiment of the present disclosure; and FIG. 25 is a flowchart of a current detection method according to an embodiment of the present disclosure.

DETAILED DESCRIPTION

For a better understanding of the solutions of the present disclosure by those skilled in the art, the technical solutions in embodiments of the present disclosure are described clearly and completely below in conjunction with the drawings in the embodiments of the present disclosure. Apparently, the embodiments described below are merely part, not all, of the embodiments of the present disclosure.

It is to be noted that the terms "first", "second" and the like in the description, claims and drawings of the present disclosure are used to distinguish between similar objects and are not necessarily used to describe a particular order or sequence. It is to be understood that the data used in this way is interchangeable where appropriate so that the embodiments of the present disclosure described herein may also be implemented in a sequence not illustrated or described herein. In addition, terms "including" and "having" or any variations thereof are intended to encompass a non-exclusive inclusion. For example, a process, method, system, product or apparatus that includes a series of steps or units not only includes the expressly listed steps or units but may also include other steps or units that are not expressly listed or are inherent to such a process, method, product or apparatus.

Figure 1:
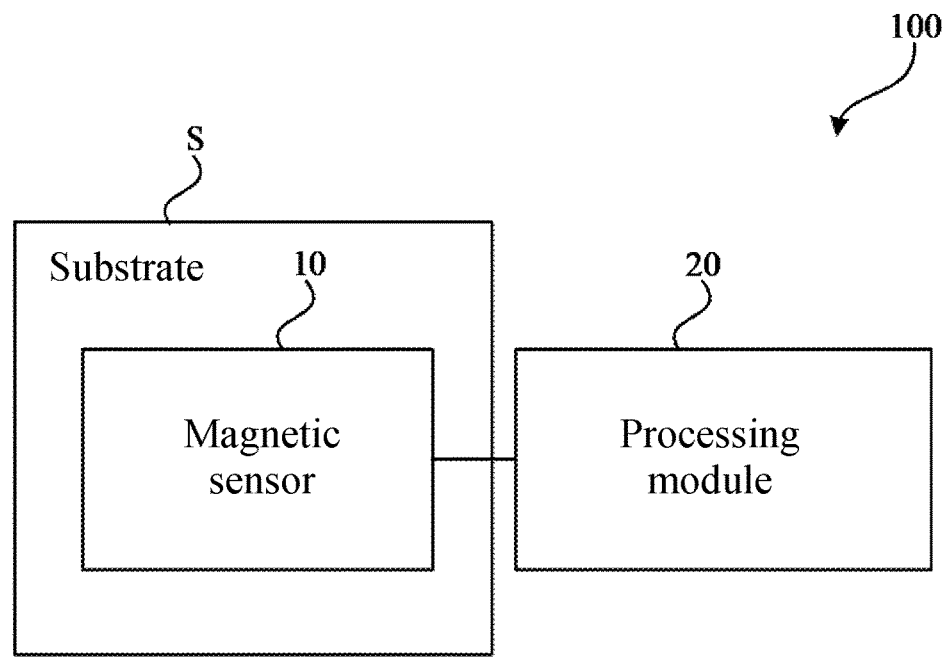
FIG. 1 is a structural diagram of a current detection apparatus according to an embodiment of the present disclosure.
Figure 2:
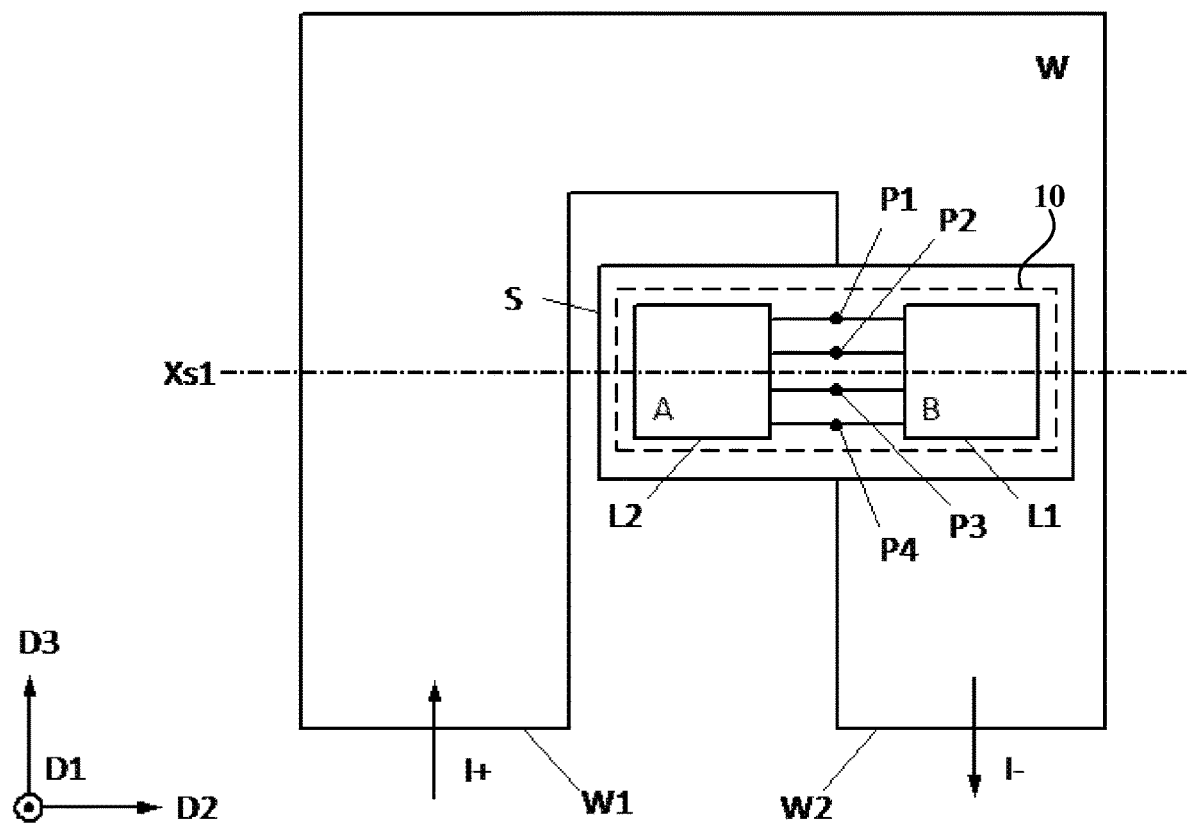
FIG. 2 is a structural view of another current detection apparatus according to an embodiment of the present disclosure.
Figure 3:
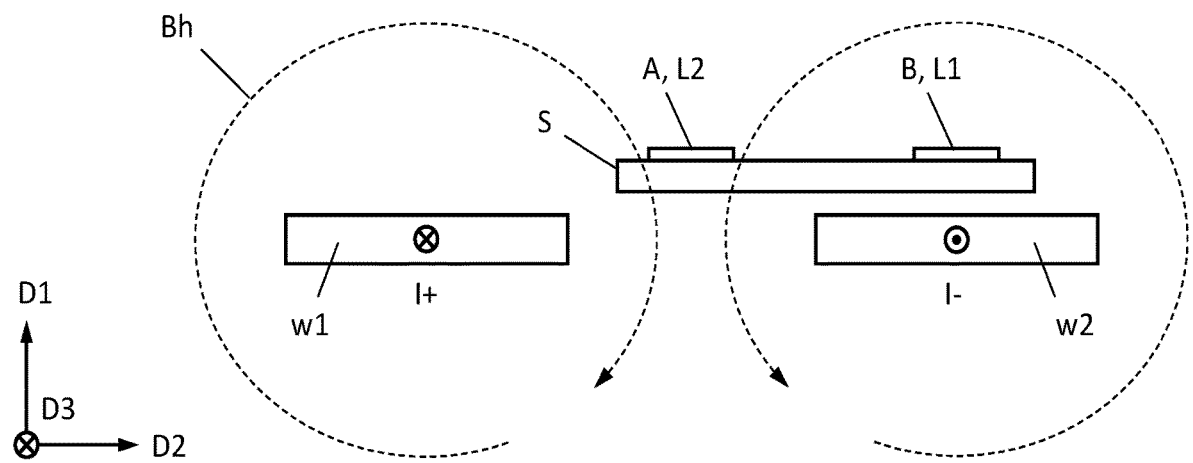
FIG. 3 is a sectional view of the current detection apparatus of FIG. 2 along Xs1 according to an embodiment of the present disclosure.

FIG. 1 is a structural diagram of a current detection apparatus according to an embodiment of the present disclosure. FIG. 2 is a structural view of another current detection apparatus according to an embodiment of the present disclosure. FIG. 3 is a sectional view of the current detection apparatus of FIG. 2 along Xs1 according to an embodiment of the present disclosure. With reference to FIG. 1 to FIG. 3, a conductor W is arranged in a preset detection area corresponding to a current detection apparatus 100 according to an embodiment of the present disclosure; a first signal magnetic field is generated when a current I passes through the conductor W. The current detection apparatus provided in the embodiment of the present disclosure includes a substrate S, at least one magnetic sensor 10 arranged on the substrate S, and a processing circuit 20. The magnetic sensor 10 includes a first sensing portion A and a second sensing portion B. The first sensing portion A and the second sensing portion B are different in a direction of a magnetic field component of the first signal magnetic field. The magnetic sensor 10 is configured to generate a sensing electrical signal according to the first signal magnetic field generated when the current I flows through the conductor W. The magnetic sensor 10 has no signal output for a second magnetic field. The second magnetic field includes a uniform magnetic field outside the conductor W. The processing circuit 20 is connected to the magnetic sensor 10 and is configured to determine, according to the sensing electrical signal, a value of the current flowing through the conductor W.

In an embodiment, the current I flows in the conductor W. When the current I flows into the conductor W from the first terminal w1 of the conductor W, the current I flows out of the conductor W from the second terminal w2 of the conductor W. A first signal magnetic field is generated when the current I passes through the conductor W. The conductor W is arranged in the preset detection area corresponding to the current detection apparatus provided in the embodiment of the present disclosure. Under the action of the first signal magnetic field, the magnetic sensor 10 may convert the sensed magnetic field component into an electrical signal for output. The current path formed by the conductor W may be U-shaped, linear-shaped, or S-shaped, which is not limited herein.

The current detection apparatus 100 includes the substrate S whose orthographic projection on the conductor W may partially overlap the conductor W. The magnetic sensor 10 may be arranged on the side of the substrate S facing the conductor W or on the side of the substrate S facing away from the conductor W. The magnetic sensor 10 may be arranged on the surface of the substrate S or partially embedded in the substrate S. The number of magnetic sensors 10 may be one or more. In the case where a plurality of magnetic sensors 10 are arranged on the substrate S, the plurality of magnetic sensors 10 may be arranged on the same side or on different sides of the substrate S, which is not limited herein.

The first sensing section A and the second sensing section B of the magnetic sensor 10 differ in the direction of the magnetic field component of the first signal magnetic field. In an embodiment, referring to FIG. 2, the substrate S is closer to and at a distance from the second terminal w2 of the conductor W. When the positive current I is introduced into the conductor W from the first terminal w1 and derived from the second terminal w2, a first signal magnetic field Bh is generated. The direction of the magnetic field component of the first signal magnetic field Bh is clockwise around the first terminal w1 and counterclockwise around the second terminal w2. With such a magnetic field distribution, a magnetic field component in the −D2 direction is generated at the second sensing portion B. That is, the second sensing portion B of the magnetic sensor 10 detects a first signal magnetic field in the −D2 direction. The current I generates a magnetic field component in the −D1 direction at the first sensing portion A. That is, the first sensing portion A of the magnetic sensor 10 detects a first signal magnetic field in the −D1 direction. The magnetic sensor 10 generates the sensing electrical signal according to the first signal magnetic field generated when the current I flows through the conductor W. The magnetic sensor 10 has no signal output for a second magnetic field. The second magnetic field includes a uniform magnetic field outside the conductor W. For example, the second magnetic field may include an environmental magnetic field. With such arrangement, the magnetic sensor 10 outputs the sensing electrical signal merely for the first signal magnetic field and does not output a sensing electrical signal for the second magnetic field, thereby better eliminating the interference of the uniform magnetic field outside the conductor W.

The processing circuit 20 is connected to the magnetic sensor 10 and calculates, according to the sensing electrical signal, a value of the current flowing through the conductor W. The processing circuit 20 may perform multipole amplification, signal sampling, signal operation and the like, various calibrations such as a temperature calibration and a zero drift calibration, and processing such as ripple removal and the like on the received sensing electrical signal, so as to improve the detection accuracy of the current I flowing through the conductor W.

According to the current detection apparatus provided in the embodiment of the present disclosure, at least one magnetic sensor 10 is arranged on the substrate S; the magnetic sensor 10 includes the first sensing portion A and the second sensing portion B; the first sensing portion A and the second sensing portion B are different in the direction of the magnetic field component of the first signal magnetic field. The magnetic sensor 10 generates the sensing electrical signal according to the first signal magnetic field generated when the current I flows through the conductor W. The magnetic sensor 10 has no signal output for the second magnetic field. The second magnetic field includes the uniform magnetic field outside the conductor W. The processing circuit 20 determines, according to the sensing electrical signal, the value of the current flowing through the conductor W. In this manner, the magnetic sensor 10 merely outputs the sensing electrical signal for the first signal magnetic field and does not output the sensing electrical signal for the second magnetic field, thereby better eliminating the interference of the uniform magnetic field outside the conductor W, and improving the detection accuracy of the current I flowing through the conductor W. So that the current detection apparatus can solve the problem that the detection accuracy of the magnetic sensor is affected by the interference of the environmental magnetic field when the existing magnetic sensor detects the current.

On the basis of the preceding embodiment and with continued reference to FIG. 3, the substrate S provided in the embodiment of the present disclosure has a first surface facing the conductor W and a second surface facing away from the conductor W. The substrate S includes a first position L2 and a second position L1 which are spaced apart on the first surface or the second surface. The first sensing portion A is arranged at the first position L2. The second sensing portion B is arranged at the second position L1. The magnetic sensor 10 senses the first signal magnetic field generated when the current I passes through the conductor W. A direction of the first signal magnetic field at the first position L2 is different from a direction of the first signal magnetic field at the second position L1. Strength of the first signal magnetic field at the first position L2 is different from strength of the first signal magnetic field at the second position L1. The magnetic sensor 10 generates the sensing electrical signal according to a difference between magnetic field strength of a component of the first signal magnetic field in a preset direction at the first position L2 and magnetic field strength of a component of the first signal magnetic field in the preset direction at the second position L1.

FIG. 3 exemplarily illustrates that the second surface of the substrate S is closer to the second terminal w2 of the conductor W, and the substrate S has a preset distance range from the conductor W. When a positive current I+ is introduced into the conductor W from the first terminal w1 and derived from the second terminal w2, a first signal magnetic field Bh is generated. The direction of the first signal magnetic field Bh is clockwise around the first terminal w1 and counterclockwise around the terminal w2. With such distribution of the first signal magnetic field, a magnetic field component in the −D2 direction is generated at the second position L1. That is, the second sensing portion B of the magnetic sensor 10 detects a first signal magnetic field in the −D2 direction. The current I generates a magnetic field component in the −D1 direction at the first position L2. That is, the first sensing portion A of the magnetic sensor 10 detects a first signal magnetic field in the −D1 direction. The magnetic sensor 10 generates the sensing electrical signal according to the difference between magnetic field strength of a component of the first signal magnetic field in a preset direction at the first position L2 and magnetic field strength of a component of the first signal magnetic field in a preset direction at the second position L1, for example, the difference in magnetic field strength between the first signal magnetic field in the −D1 direction detected by the first sensing portion A and the first signal magnetic field in the −D2 direction detected by the second sensing portion B of the magnetic sensor 10.

Figure 4:
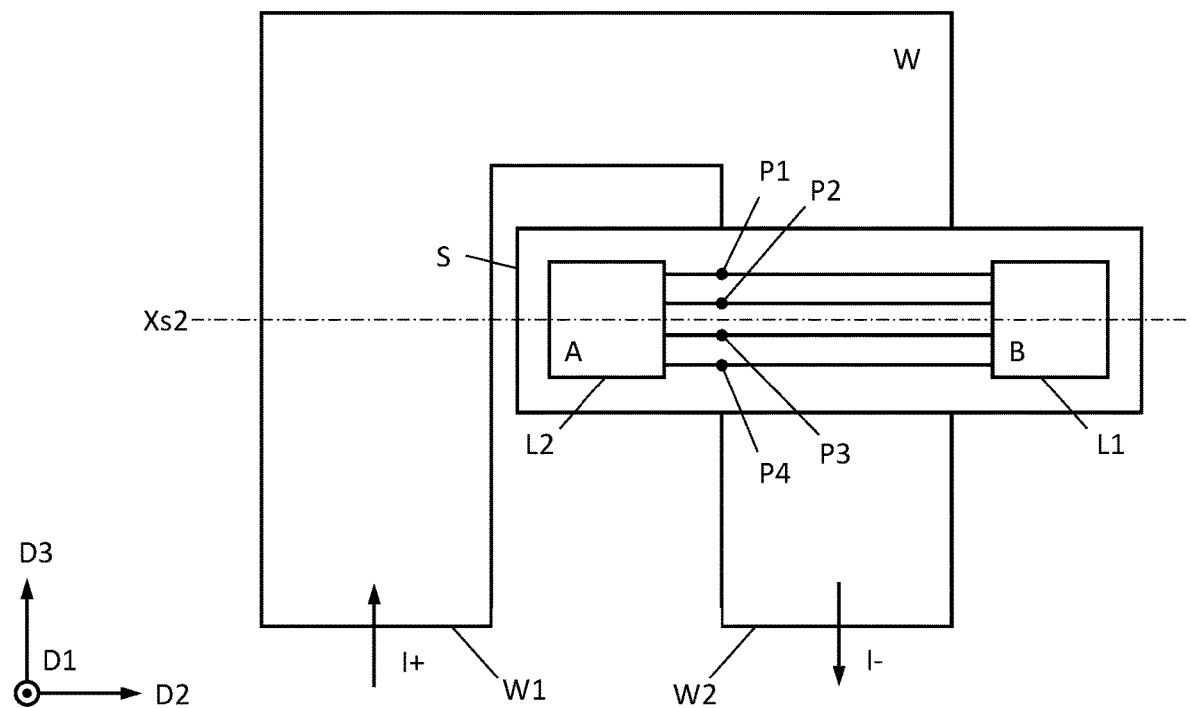
FIG. 4 is a structural view of another current detection apparatus according to an embodiment of the present disclosure.
Figure 5:
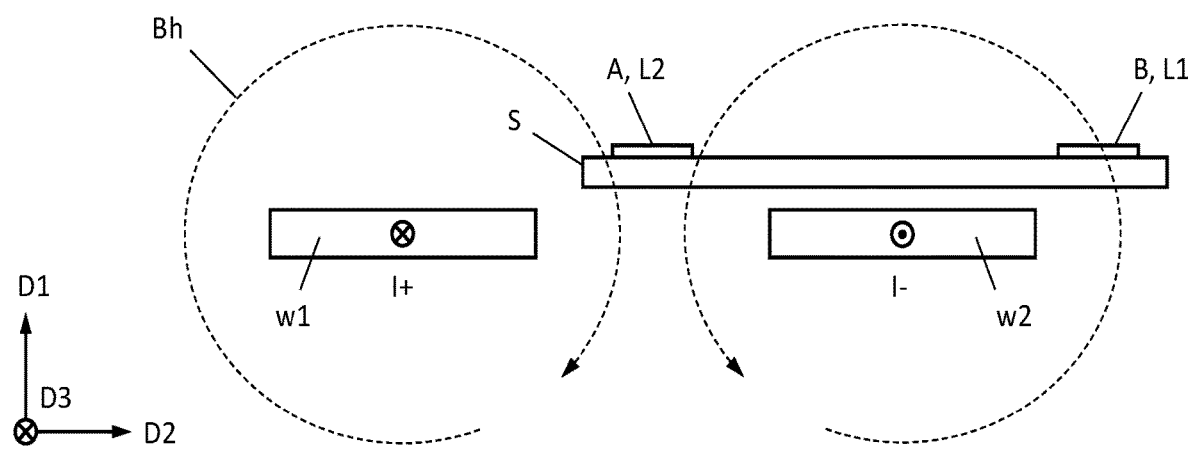
FIG. 5 is a sectional view of the current detection apparatus of FIG. 4 along Xs2 according to an embodiment of the present disclosure.

FIG. 4 is a structural view of another current detection apparatus according to an embodiment of the present disclosure. FIG. 5 is a sectional view of the current detection apparatus of FIG. 4 along Xs2 according to an embodiment of the present disclosure. On the basis of the preceding embodiments and with continued reference to FIG. 2 to FIG. 5, the sensitive direction of the magnetic sensor 10 provided in the embodiment of the present disclosure is parallel to or perpendicular to the plane where the substrate S is disposed.

In the case where the sensitive direction of the magnetic sensor 10 is perpendicular to the plane where the substrate S is disposed, for example, the sensitive direction of the magnetic sensor 10 is the D1 direction in FIG. 5, the magnetic sensor 10 may be provided to generate an output merely for the component of the first signal magnetic field in the D1 direction. The sensitive direction of the magnetic sensor 10 is parallel to the plane where the substrate S is disposed. The direction of the first signal magnetic field generated by the current I at the second position L1 on the substrate S is mainly parallel to the D2 direction and is mainly perpendicular to the substrate S at the first position L2, that is, parallel to the D1 direction. The magnetic sensor 10 may be a perpendicular magnetic sensor 10 or a planar magnetic sensor 10.

With reference to FIG. 4 and FIG. 5, the magnetic sensor 10 may be the planar magnetic sensor 10. When the positive current I is introduced into the conductor W from w1 and derived from w2, the first signal magnetic field Bh is generated. The direction of the first signal magnetic field Bh is clockwise around the first terminal w1 and counterclockwise around the second terminal w2. With such arrangement, magnetic field components in the –D2 direction and in the +D1 direction are generated at the second position L1, and the current I generates a magnetic field component in the –D1 direction at the first position L2. The first sensing portion A of the magnetic sensor 10 has merely the magnetic field component in the –D1 direction and the second sensing portion B has a magnetic field component in the +D1 direction. Therefore, better performance of the current detection apparatus can be obtained by the use of the planar magnetic sensor 10.

Figure 6:
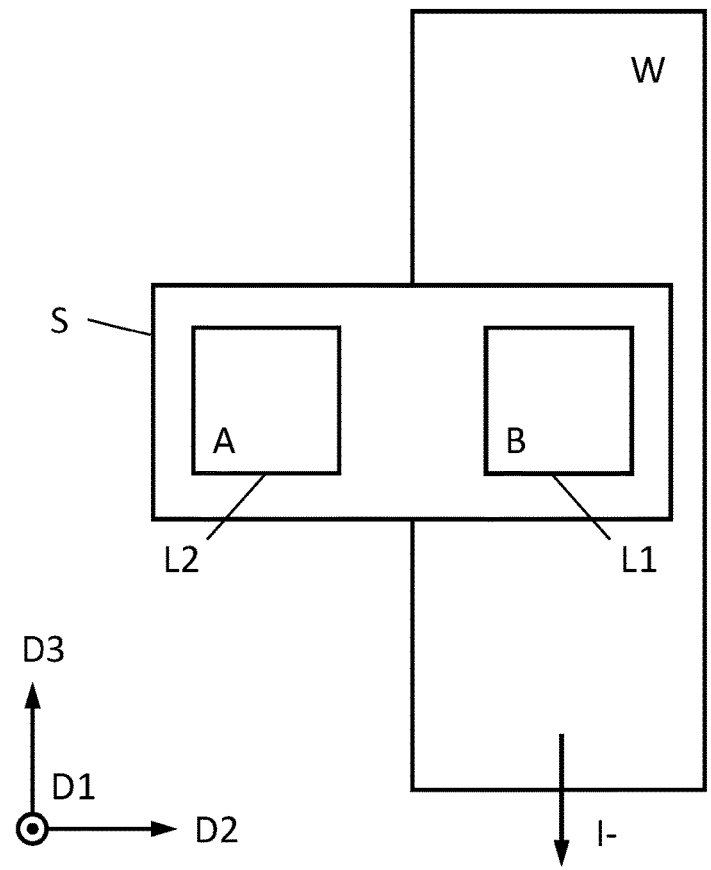
FIG. 6 is a structural view of another current detection apparatus according to an embodiment of the present disclosure.
Figure 7:
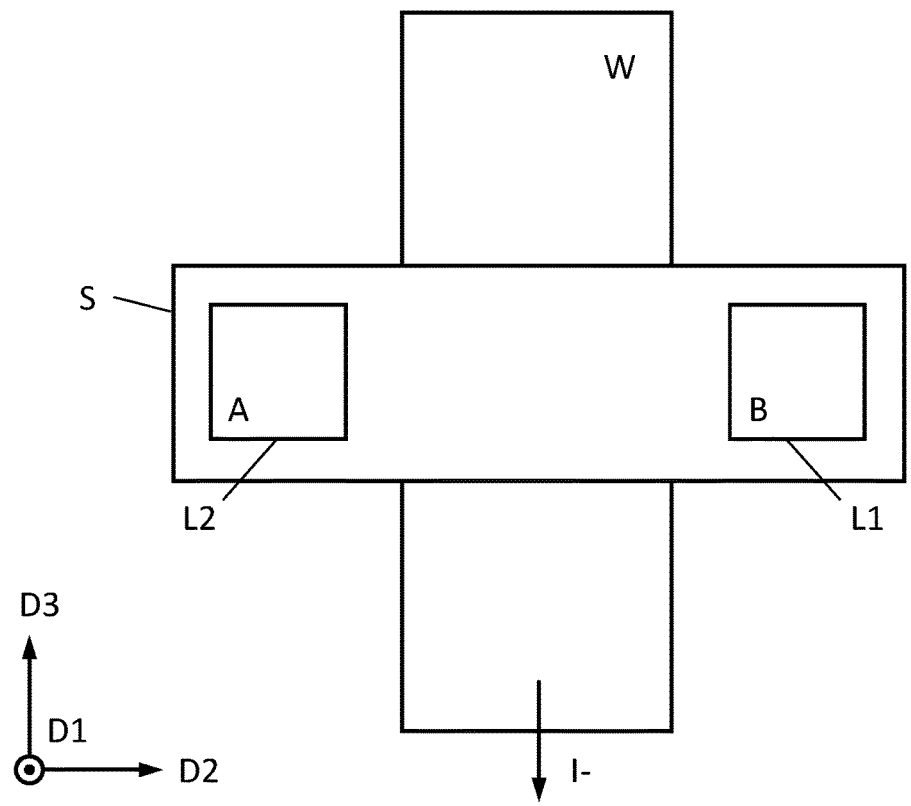
FIG. 7 is a structural view of another current detection apparatus according to an embodiment of the present disclosure.
Figure 8:
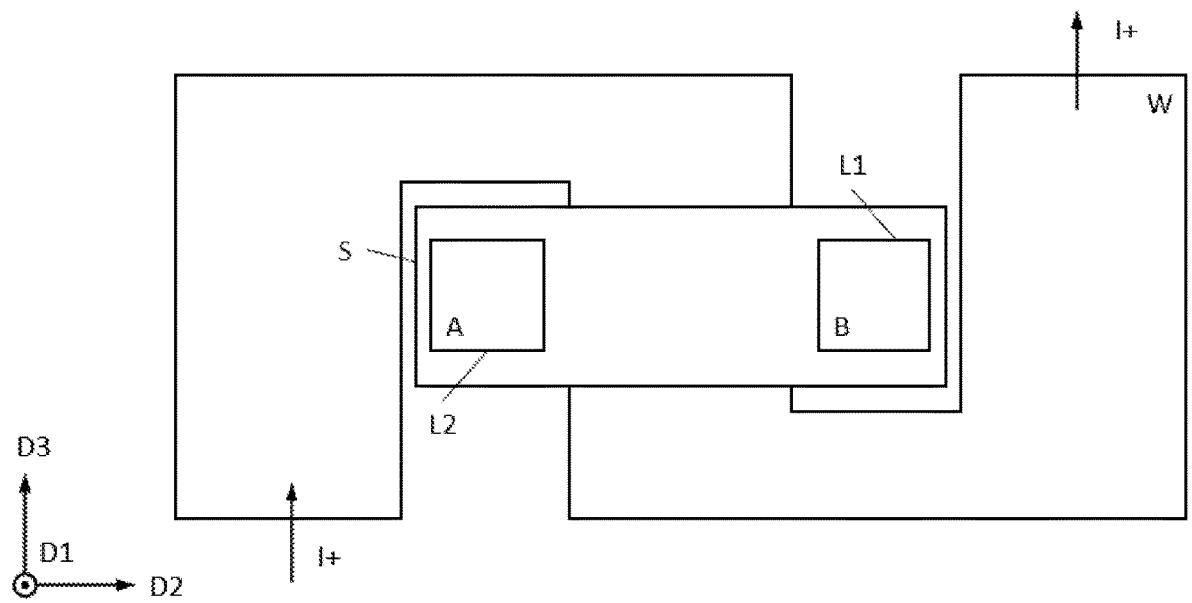
FIG. 8 is a structural view of another current detection apparatus according to an embodiment of the present disclosure.

FIG. 6 is a structural view of another current detection apparatus according to an embodiment of the present disclosure. FIG. 7 is a structural view of another current detection apparatus according to an embodiment of the present disclosure. FIG. 8 is a structural view of another current detection apparatus according to an embodiment of the present disclosure. On the basis of the preceding embodiments and with continued reference to FIG. 2 to FIG. 8, the conductor W at least partially overlaps an orthographic projection of the first sensing portion A on the conductor W and/or an orthographic projection of the second sensing portion B on the conductor W; or the conductor W does not overlap an orthographic projection of the first sensing portion A on the conductor W or an orthographic projection of the second sensing portion B on the conductor W.

FIG. 4 exemplarily shows a case where the conductor W is U-shaped, the orthographic projection of the first sensing portion A on the substrate S does not overlap the conductor W, and the orthographic projection of the second sensing portion B on the substrate S does not overlap the conductor W. FIG. 6 exemplarily shows a case where the conductor W is linear-shaped, the orthographic projection of the first sensing portion A on the substrate S does not overlap the conductor W, and the orthographic projection of the second sensing portion B on the substrate S overlaps the conductor W. FIG. 7 exemplarily shows a case where the conductor W is linear-shaped, the first sensing portion A and the second sensing portion B are connected across opposite sides of the conductor W, and the conductor W does not overlap the orthographic projection of the first sensing portion A on the substrate S or the orthographic projection of the second sensing portion B on the substrate S, which is not limited herein. FIG. 8 exemplarily shows a case where the conductor W is S-shaped, the first sensing portion A and the second sensing portion B are connected across opposite sides of the conductor W, and the conductor W does not overlap the orthographic projection of the first sensing portion A on the substrate S or the orthographic projection of the second sensing portion B on the substrate S. The first sensing portion A of the magnetic sensor 10 is arranged at the first position L2 on the inner side of a turn of the conductor W, the second sensing portion B of the magnetic sensor 10 is arranged at the second position L1 on the inner side of another turn of the conductor W, and the conductor W does not overlap the orthographic projection of the first sensing portion A on the conductor W or the orthographic projection of the second sensing portion B on the conductor W, which is not limited herein.

With reference to FIG. 4, the current detection apparatus includes a substrate S including a magnetic sensor 10, and a conductor W is arranged near the substrate S. The substrate S may be a semiconductor W chip which may include an integrated circuit. The first sensing portion A and the second sensing portion B of the magnetic sensor 10 are connected to each other through wires arranged on the substrate S and four contacts are formed. The conductor W forms a U-shaped structure. The conductor W has a first terminal w1 and a second terminal w2. A current I may be introduced from w1, pass through a U-shaped path, and then derived from w2, and vice versa. The current direction parallel to the D3 direction is defined as positive and the current direction parallel to and opposite to the D3 direction is defined as negative. The substrate S partially overlaps the conductor W. The first sensing portion A of the magnetic sensor 10 is arranged at the first position L2 on the inner side of the turn of the conductor W, and the conductor W does not overlap the orthographic projection of the first sensing portion A on the conductor W. The second sensing portion B of the magnetic sensor 10 is arranged outside the second terminal w2 of the conductor W, and the second sensing portion B is arranged at the second position L1 where the orthographic projection of the second sensing portion B does not overlap the conductor W. The second position L1 may also be arranged outside the first terminal w1 of the conductor W, and the second sensing portion B is arranged at a position where the orthographic projection of the conductor W does not overlap or partially overlaps the projection of the conductor W.

With such arrangement, the first sensing portion A and the second sensing portion B differ in direction of the magnetic field component of the first signal magnetic field, so that the magnetic sensor 10 can output a sensing electrical signal under the first signal magnetic field, and the detection of the current value of the current I introduced into the conductor W can be achieved.

Figure 9:
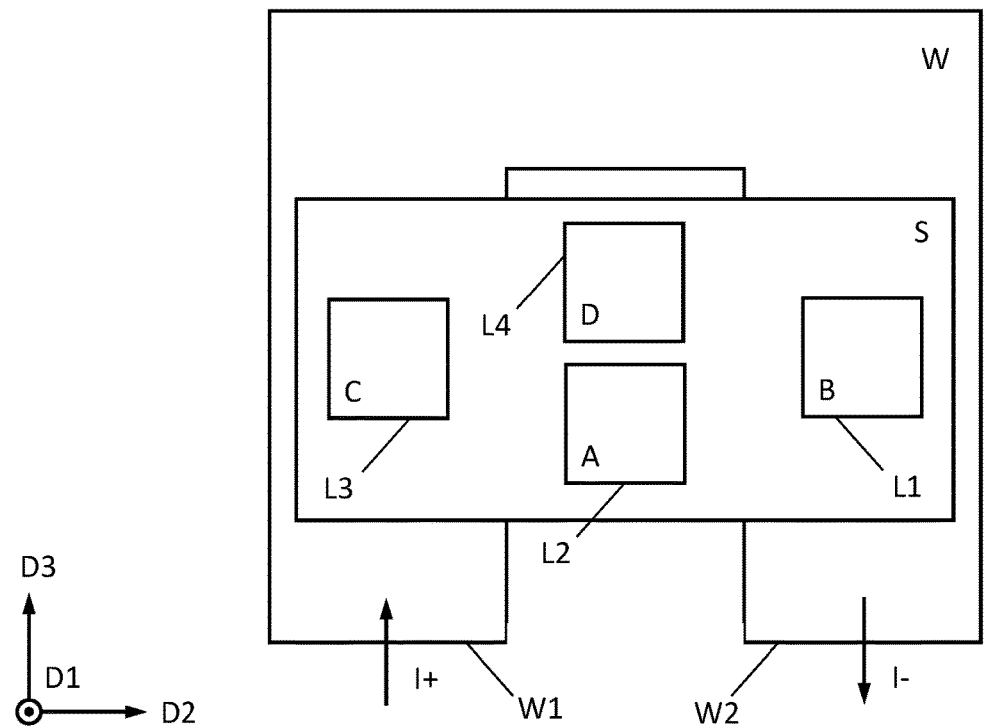
FIG. 9 is a structural view of another current detection apparatus according to an embodiment of the present disclosure.

FIG. 9 is a structural view of another current detection apparatus according to an embodiment of the present disclosure. On the basis of the preceding embodiments and with continued reference to FIG. 2 to FIG. 9, along an extension direction of the first sensing portion A pointing to the second sensing portion B provided in the embodiment of the present disclosure, the magnetic sensor 10 crosses an extension direction of the conductor W.

With such arrangement, the first sensing portion A and the second sensing portion B differ in direction of the magnetic field component of the first signal magnetic field, so that the magnetic sensor 10 can output a sensing electrical signal under the first signal magnetic field, and the detection of the current value of the current I introduced into the conductor W can be achieved.

Figure 10:
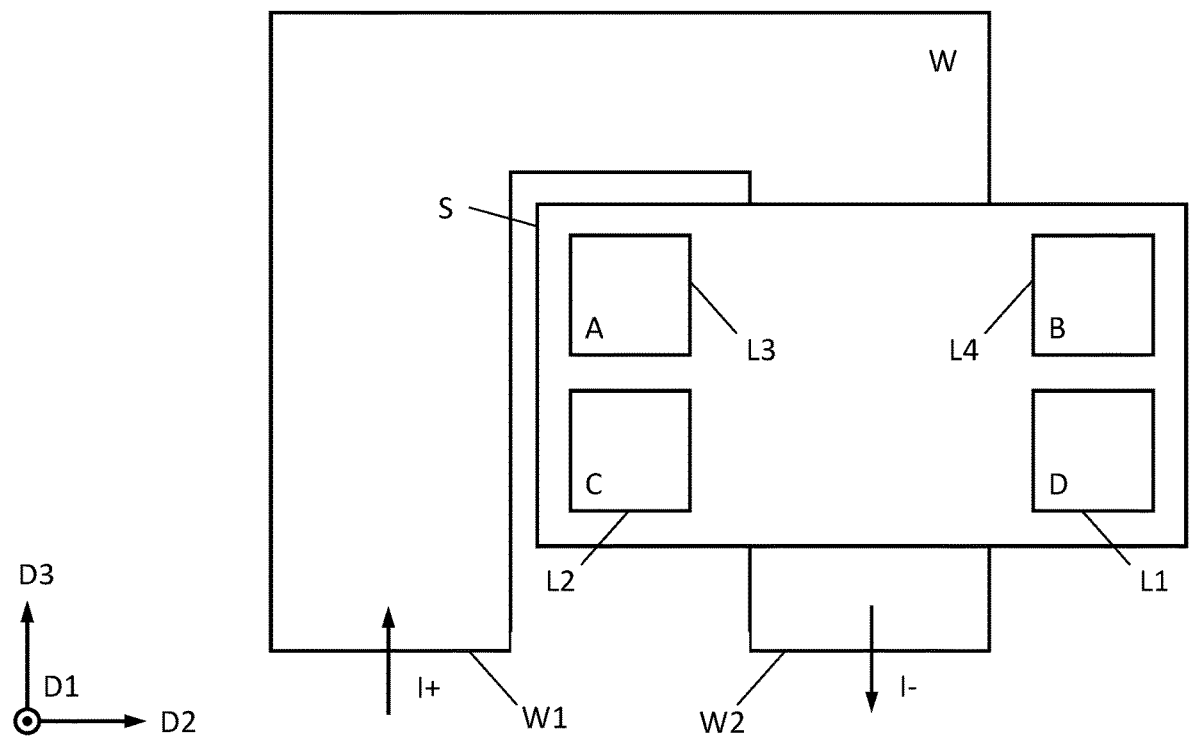
FIG. 10 is a structural view of another current detection apparatus according to an embodiment of the present disclosure.
Figure 11:
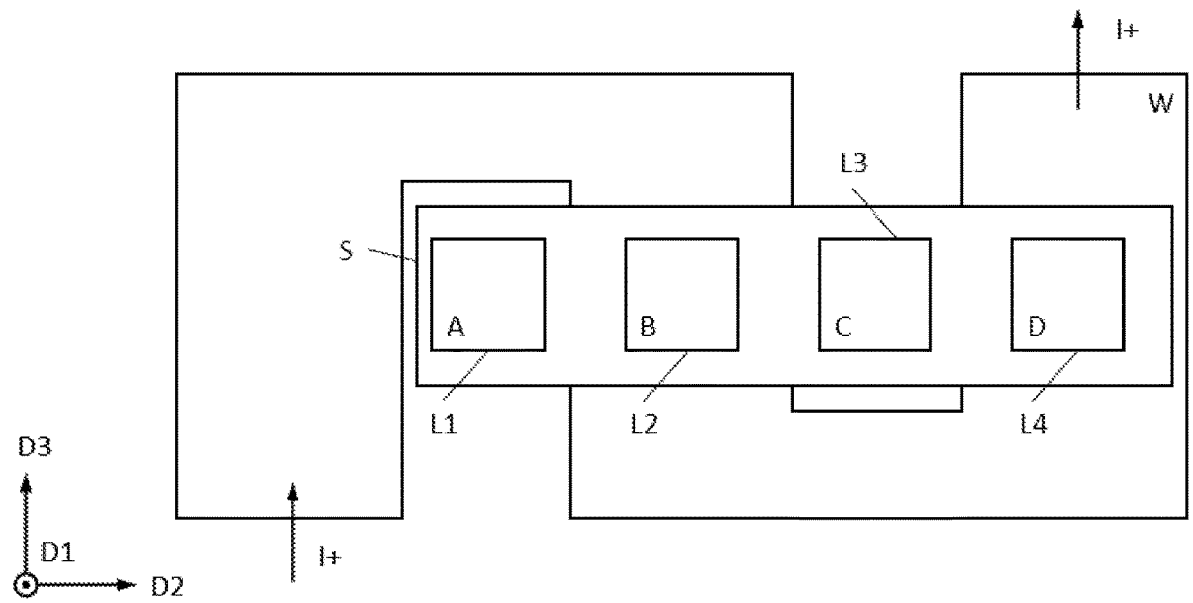
FIG. 11 is a structural view of another current detection apparatus according to an embodiment of the present disclosure.
Figure 12:
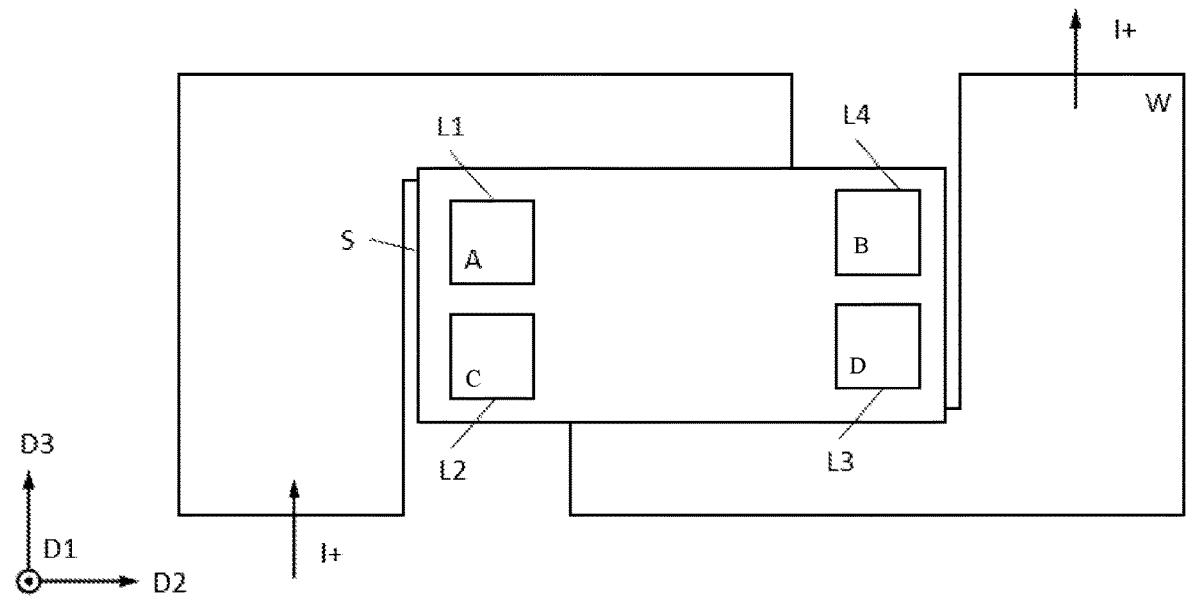
FIG. 12 is a structural view of another current detection apparatus according to an embodiment of the present disclosure.
Figure 13:
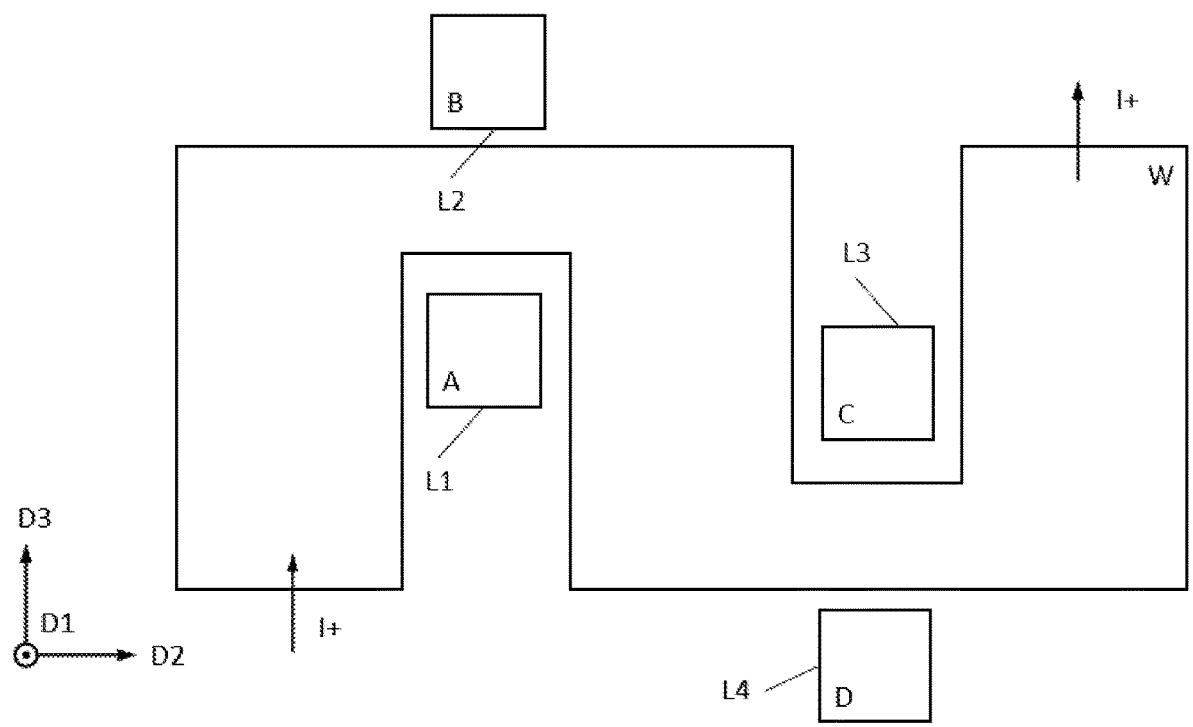
FIG. 13 is a structural view of another current detection apparatus according to an embodiment of the present disclosure.

FIG. 10 is a structural view of another current detection apparatus according to an embodiment of the present disclosure. FIG. 11 is a structural view of another current detection apparatus according to an embodiment of the present disclosure. FIG. 12 is a structural view of another current detection apparatus according to an embodiment of the present disclosure. FIG. 13 is a structural view of another current detection apparatus according to an embodiment of the present disclosure. With reference to FIG. 10 to FIG. 13, along the extension direction of the first sensing portion A pointing to the second sensing portion B, the magnetic sensor 10 is perpendicular to the extension direction of the conductor W.

With such arrangement, the strength of the sensing electrical signal output by the magnetic sensor 10 under the first signal magnetic field can be further improved, and the detection accuracy of the current value of the current I introduced into the conductor W can be further improved.

It is to be noted that FIG. 10 to FIG. 13 exemplarily show a case where the current detection apparatus includes two magnetic sensors 10; a first magnetic sensor 10 includes a first sensing portion A and a second sensing portion B, and a second magnetic sensor 10 includes a third sensing portion C and a fourth sensing portion D. FIG. 9 exemplarily shows a case where along an extension direction of the first sensing portion A pointing to the second sensing portion B, the magnetic sensor 10 crosses an extension direction of the conductor W. FIG. 10 to FIG. 13 exemplarily show a case where along the extension direction of the first sensing portion A pointing to the second sensing portion B, the magnetic sensor 10 is perpendicular to the extension direction of the conductor W, which is not limited herein.

FIG. 10 exemplarily shows a case where the conductor W is U-shape; the conductor W does not overlap the orthographic projection of the first magnetic sensor on the substrate S or the orthographic projection of the second magnetic sensor on the substrate S. FIG. 11 exemplarily shows a case where the conductor W is S-shaped; the orthographic projection of the first sensing portion A of the first magnetic sensor on the substrate S does not overlap the conductor W, the orthographic projection of the second sensing portion B of the first magnetic sensor on the substrate S overlaps the conductor W, the orthographic projection of the third sensing portion C of the second magnetic sensor on the substrate S does not overlap the conductor W, and the orthographic projection of the fourth sensing portion D of the second magnetic sensor on the substrate S overlaps the conductor W. FIG. 12 exemplarily shows a case where the conductor W is S-shaped; the first sensing portion A and the second sensing portion B of the first magnetic sensor are connected across opposite sides of the conductor W; the third sensing portion C and the fourth sensing portion D of the second magnetic sensor are connected across opposite sides of the conductor W; the conductor W does not overlap the orthographic projection of the first sensing portion A, the orthographic projection of the second sensing portion B, the orthographic projection of the third sensing portion C or the orthographic projection of the fourth sensing portion D on the substrate S. FIG. 13 exemplarily shows a case where the conductor W is S-shaped; the first sensing portion A and the second sensing portion B are connected across opposite sides of the conductor W; the conductor W does not overlap the orthographic projection of the first sensing portion A or the orthographic projection of the second sensing portion B on the substrate S; the first sensing portion A of the first magnetic sensor 10 is arranged at the second position L1 on the inner side of a turn of the conductor W; the second sensing portion B of the first magnetic sensor 10 is arranged at the first position L2 outside the conductor W. The third sensing portion C of the second magnetic sensor is arranged at a third position L3 on the inner side of another turn, and the fourth sensing portion D of the second magnetic sensor 10 is arranged at a fourth position L4 outside the conductor W. The conductor W does not overlap the orthographic projection of the first sensing portion A, the orthographic projection of the second sensing portion B, the orthographic projection of the third sensing portion C or the orthographic projection of the fourth sensing portion D on the conductor W, which is not limited herein.

On the basis of the preceding embodiments and with continued reference to FIG. 2 and FIG. 4, the magnetic sensor 10 provided in the embodiment of the present disclosure may further include a plurality of first connection lines and a plurality of output terminals; the first sensing portion A and the second sensing portion B are connected in parallel through the first connection lines, and each first connection line is connected to one output terminal.

With such arrangement, the first sensing portion A and the second sensing portion B are connected in parallel through the first connection lines, and each first connection line leads out one output terminal. The output terminals are configured to output the sensing electrical signals generated by the first sensing portion A and the second sensing portion B.

On the basis of the preceding embodiments and with continued reference to FIG. 2, the output terminals of the magnetic sensor 10 provided in the embodiment of the present disclosure may include a first output terminal P2 and a second output terminal P4. The first output terminal P2 is configured to output a first sensing electrical signal of the magnetic sensor 10. The second output terminal P4 is configured to output a second sensing electrical signal of the magnetic sensor 10. Under the first signal magnetic field, the first sensing electrical signal and the second sensing electrical signal have different amplitude variations and phase variations. Under the second magnetic field, the first sensing electrical signal and the second sensing electrical signal have a same amplitude variation and a same phase variation.

With such arrangement, under the first signal magnetic field, the first sensing electrical signal output from the first output terminal P2 and the second sensing electrical signal output from the second output terminal P4 may have different amplitude variations and phase variations so that the strength of the sensing electrical signal output from the magnetic sensor 10 can be enhanced. Under the second magnetic field, the first sensing electrical signal output from the first output terminal P2 and the second sensing electrical signal output from the second output terminal P4 may have the same amplitude variation and the same phase variation so that the sensing electrical signal output from the magnetic sensor 10 under the second magnetic field does not include a signal of a uniform magnetic field. With such arrangement, the current detection accuracy of the current detection apparatus is further improved, and the anti-electromagnetic interference ability of the current detection apparatus is improved.

Figure 14:
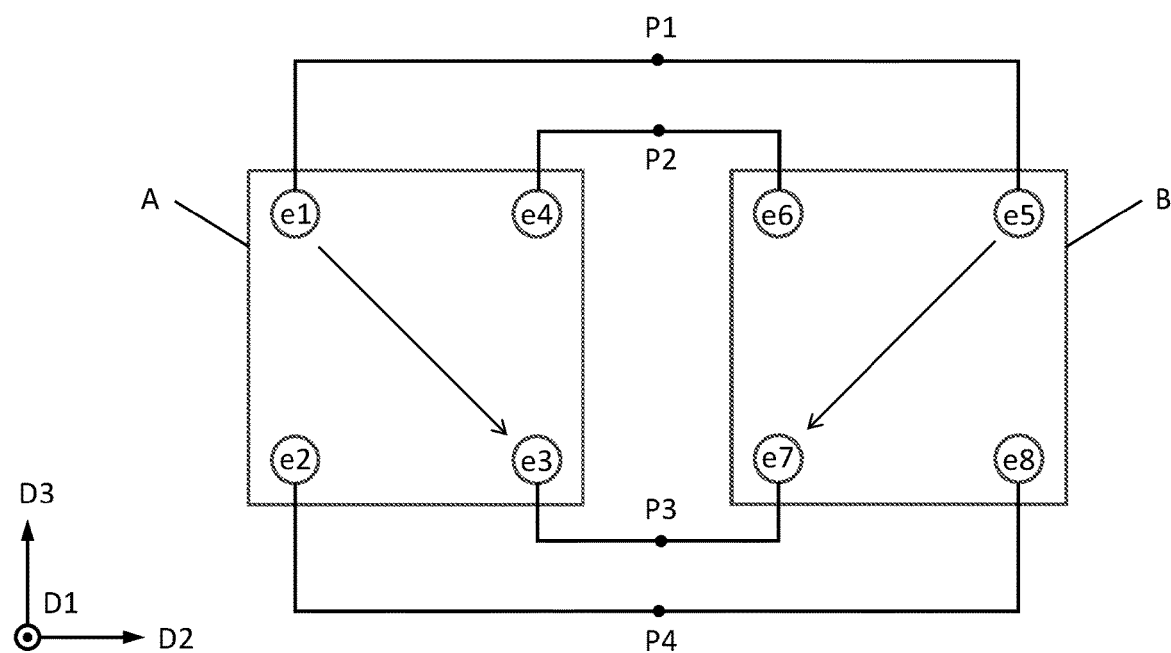
FIG. 14 is a structural view of another current detection apparatus according to an embodiment of the present disclosure.

FIG. 14 is a structural view of another current detection apparatus according to an embodiment of the present disclosure. On the basis of the preceding embodiments and with continued reference to FIG. 14, the output terminals of the magnetic sensor 10 provided in the embodiment of the present disclosure further includes a first drive terminal P1 and a second drive terminal P3. The first drive terminal P1 is configured to be connected to a power supply and the second drive terminal P3 is configured to be grounded; or the first drive terminal P1 is configured to be grounded and the second drive terminal P3 is configured to be connected to a power supply. The first sensing portion A includes a first contact e1, a second contact e2, a third contact e3 and a fourth contact e4. The second sensing portion B includes a fifth contact e5, a sixth contact e6, a seventh contact e7 and an eighth contact e8. The first contact e1 and the fifth contact e5 are connected as the first drive terminal P1. The second contact e2 and the eighth contact e8 are connected as the second output terminal P4. The third contact e3 and the seventh contact e7 are connected as the second drive terminal P3. The fourth contact e4 and the sixth contact e6 are connected as the first output terminal P2.

With reference to FIG. 14, the magnetic sensor 10 may be a planar Hall sensor whose sensitive direction may be perpendicular to the direction of the plane of the substrate S. The first sensing portion A of the magnetic sensor 10 may include a Hall cell forming four contacts, that is, the first contact e1, the second contact e2, the third contact e3 and the fourth contact e4. The second sensing portion B of the magnetic sensor 10 may include a Hall cell forming four contacts, that is, the fifth contact e5, the sixth contact e6, the seventh contact e7 and the eighth contact e8. The first contact e1 and the fifth contact e5 are connected as the first drive terminal P1. The second contact e2 and the eighth contact e8 are connected as the second output terminal P4. The third contact e3 and the seventh contact e7 are connected as the second drive terminal P3. The fourth contact e4 and the sixth contact e6 are connected as the first output terminal P2.

The first drive terminal P1 and the second drive terminal P3 may be connected to the power supply and the ground, respectively. In the Hall cell of the first sensing portion A, a current flows from the first contact e1 to the third contact e3. In the Hall cell of the second sensing portion B, the current flows from the fifth contact e5 to the seventh contact e7. The first output terminal P2 and the second output terminal P4 are signal output terminals.

Figure 15:
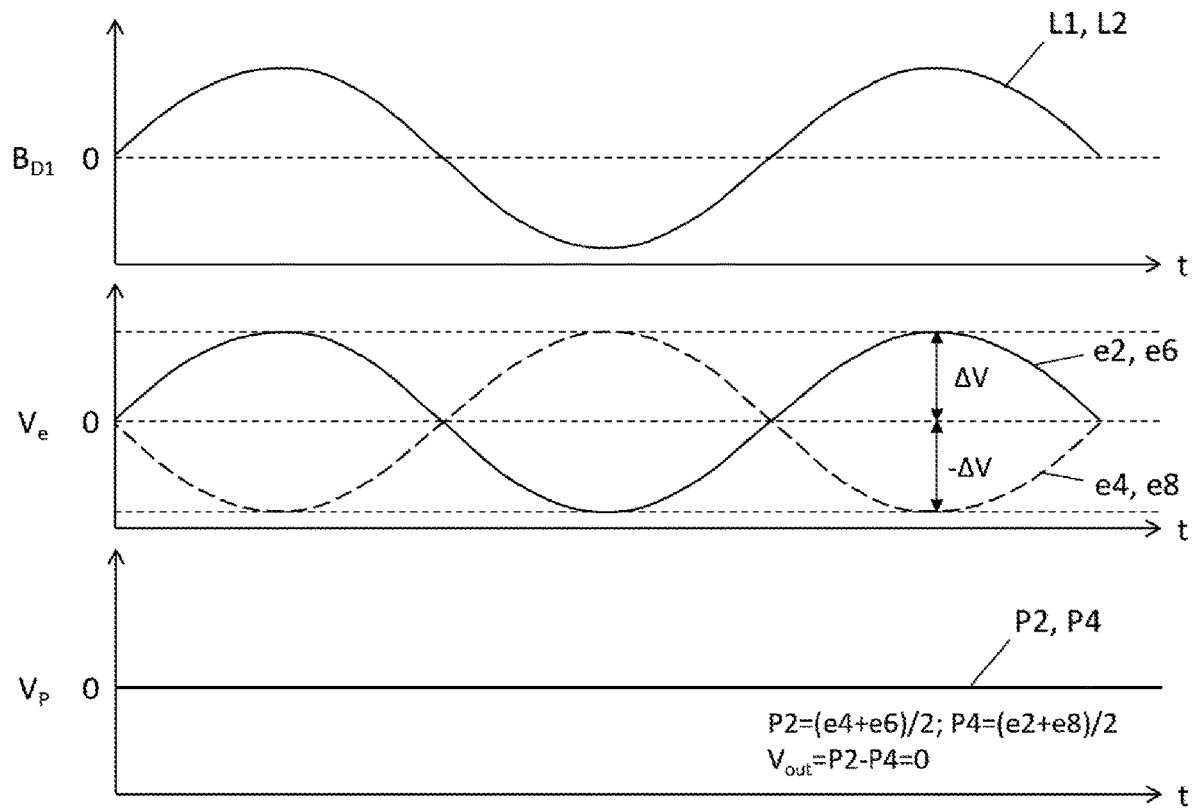
FIG. 15 is a diagram of waveforms output by a magnetic sensor of a current detection apparatus for a second magnetic field according to an embodiment of the present disclosure.

FIG. 15 is a diagram of waveforms output by a magnetic sensor 10 of a current detection apparatus for a second magnetic field according to an embodiment of the present disclosure. With reference to FIG. 2 and FIG. 15, when the second magnetic field Bpi, that is, the external environment uniform magnetic field varies with time, the magnetic fields at the first position L2 and the second position L1 on the substrate S vary consistently. The potentials of the second contact e2 and the sixth contact e6 in the magnetic sensor 10 vary in phase consistently with the second magnetic field $B_{D1}$, resulting in a fluctuation of +/−ΔV. The potentials of the fourth contact e4 and the eighth contact e8 vary in phase inversely with the second magnetic field, but the amplitudes are the same. The potential of the first output terminal P2 is (e4+e6)/2. The potential of the second output terminal P4 is (e2+e8)/2. The output $V_{out}$ of the magnetic sensor 10 as a whole is 0 which is obtained from the voltage of the first output terminal P2 minus the voltage of the second output terminal P4. Since the contact potential variations of the first output terminal P2 and the second output terminal P4 are completely consistent, the magnetic sensor 10 does not generate a signal output for the uniformly interfering magnetic field of the external environment, thus achieving the anti-external magnetic interference function of the magnetic sensor 10 outputting the sensing electrical signal.

Figure 16:
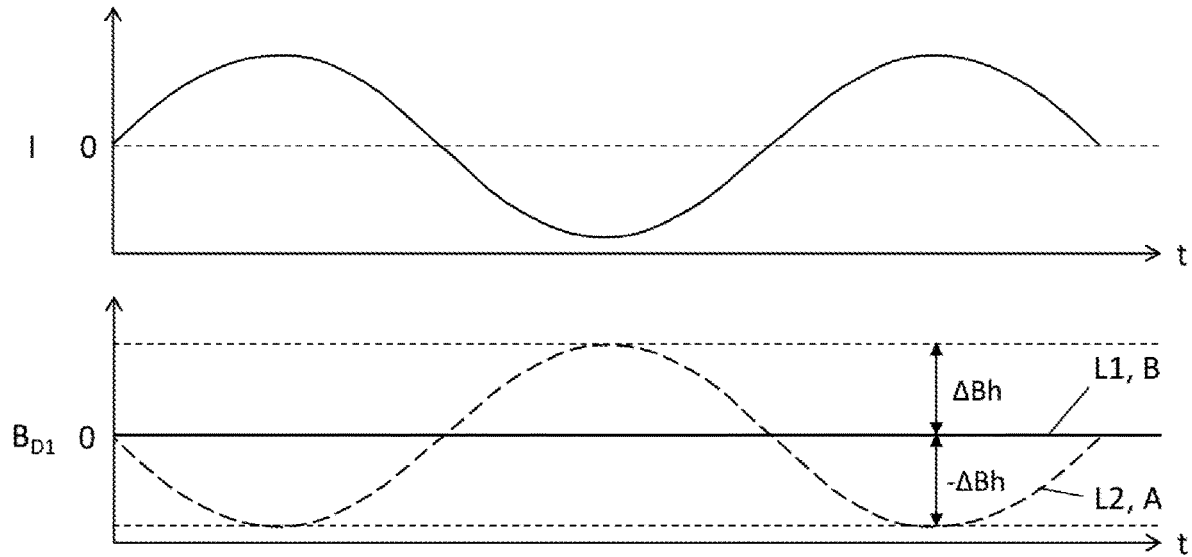
FIG. 16 is an output waveform diagram of variations of magnetic field components at a first position and a second position caused by a variation of the current in a conductor of a current detection apparatus according to an embodiment of the present disclosure.

FIG. 16 is an output waveform diagram of variations of magnetic field components at a first position L2 and a second position L1 caused by a variation of the current in a conductor W of a current detection apparatus according to an embodiment of the present disclosure. FIG. 2 and FIG. 16 illustrate the variations of the signal magnetic field components at the second position L1 and the first position L2 of the magnetic sensor 10 when the current I varies inside the conductor W. In the case where the current at the terminal w1 of the conductor W is positive, the magnetic field generated at the second position L1, that is, at the second sensing portion B of the magnetic sensor 10, is mainly a horizontal component $B_{D2}$, that is, in the −D2 direction, and the vertical component approaches zero. At the first position L2, that is, at the first sensing portion A of the magnetic sensor 10, the vertical magnetic field component varies with the current I in the conductor W by +/−ΔBh. The vertical magnetic field component $B_{D1}$ generated by the current I varies in phase inversely with the current I.

Figure 17:
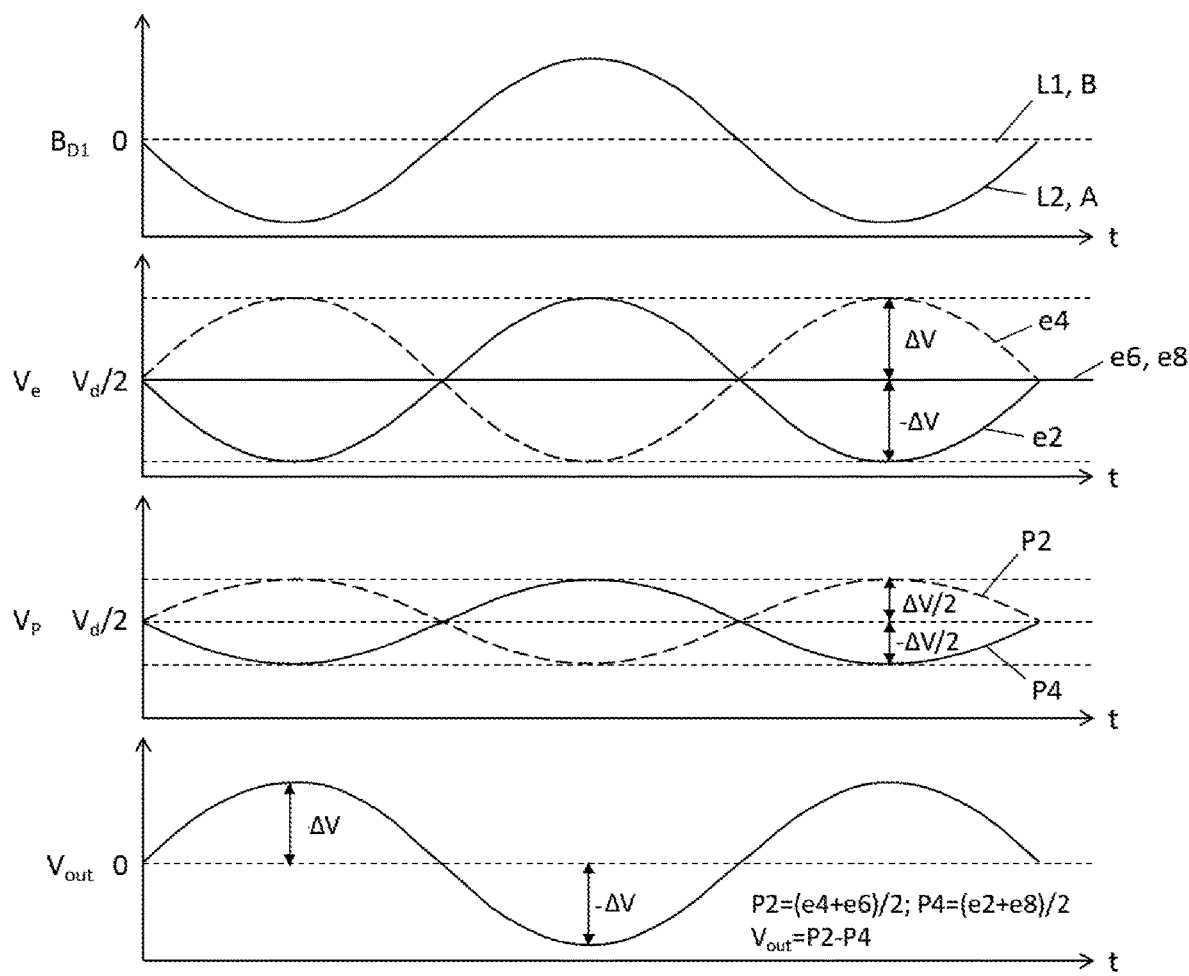
FIG. 17 is an output waveform diagram of a magnetic sensor of a current detection apparatus detecting a current by using magnetic field variations in the D1 direction according to an embodiment of the present disclosure.

FIG. 17 is an output waveform diagram of a magnetic sensor 10 of a current detection apparatus detecting a current I by using magnetic field variations in the D1 direction according to an embodiment of the present disclosure. With reference to FIG. 17, in the case where the sensitive direction of the magnetic sensor 10 is perpendicular to the plane of the substrate S, that is, is in the D1 direction, in the configuration shown in FIG. 2, the magnetic sensor 10 generates an output merely for the component of the first signal magnetic field in the D1 direction, and the relationship between the output characteristic and the component of the signal magnetic field in the D1 direction is shown in FIG. 17. When the current I passes through the conductor W and varies in magnitude with time, as shown in the first picture of FIG. 17, the magnetic field component $B_{D1}$ of the first signal magnetic field in the D1 direction is zero at the second position L1, and the magnetic field component $B_{D1}$ varies in phase inversely with the current at the first position L2. Therefore, the potential of the second contact e2 of the first sensing portion A of the magnetic sensor 10 varies by a corresponding +/−Δ V fluctuation with the magnetic field component $B_{D1}$ of the first signal magnetic field in the D1 direction.

As shown in the second picture in FIG. 17, the variation in the potential of the second contact e2 is the same as the variation in the magnetic field component of the first signal magnetic field in the D1 direction, the potential of the fourth contact e4 has a corresponding fluctuation variation of +/−ΔV, and the potential of the fourth contact e4 varies in phase inversely with the magnetic field component B M of the first signal magnetic field in the D1 direction. The potentials of the sixth contact e6 and the eighth contact e8 of the second sensing portion B of the magnetic sensor 10 do not vary with the current I since the magnetic field component at the second position L1 in the vertical direction approaches zero. The sixth contact e6 and the eighth contact e8 of the second sensing portion B of the magnetic sensor 10 output a constant value $V_d/2$.

As shown in the third figure in FIG. 17, the potential of the first output terminal P2 is (e4+e6)/2, and the amplitude of the potential of the first output terminal P2 is +/−ΔV/2. The potential of the second output terminal P4 is (e2+e8)/2, and the amplitude of the potential of the second output terminal P4 is +/−ΔV/2. As shown in the fourth figure in FIG. 17, the phase variations of the potentials of the first output terminal P2 and the second output terminal P4 are opposite, and thus the overall output sensing electrical signal V out of the magnetic sensor 10 is (P2-P4), and the overall output sensing electrical signal of the magnetic sensor 10 has an output waveform of +/−ΔV in amplitude.

With continued reference to FIG. 2 and FIG. 14 to FIG. 17, the magnetic sensor 10 in FIG. 2 may also be a vertical Hall cell whose sensitive direction is the direction parallel to the plane of the substrate S. On the basis of any of the preceding embodiments, the first signal magnetic field generated by the current I at the second position L1 on the substrate S is mainly parallel to the D2 direction and is mainly perpendicular to the substrate S at the first position L2, that is, parallel to the D1 direction. In a case where the magnetic sensor 10 of the current detection apparatus in FIG. 2 is configured as a vertical Hall cell, the potentials of the second contact e2 and the fourth contact e4 of the first sensing portion A of the magnetic sensor 10 do not vary with the current and are constant at $V_d/2$. The potentials of the sixth contact e6 and the eighth contact e8 have output waveforms of opposite phases and the same amplitude of +/− ΔV/2. As mentioned above, the overall output sensing electrical signal $V_{out}$ of the magnetic sensor 10 is (P2−P4), and the amplitude of the overall output sensing electrical signal of the magnetic sensor 10 is +/−ΔV in the output waveform.

Figure 18:
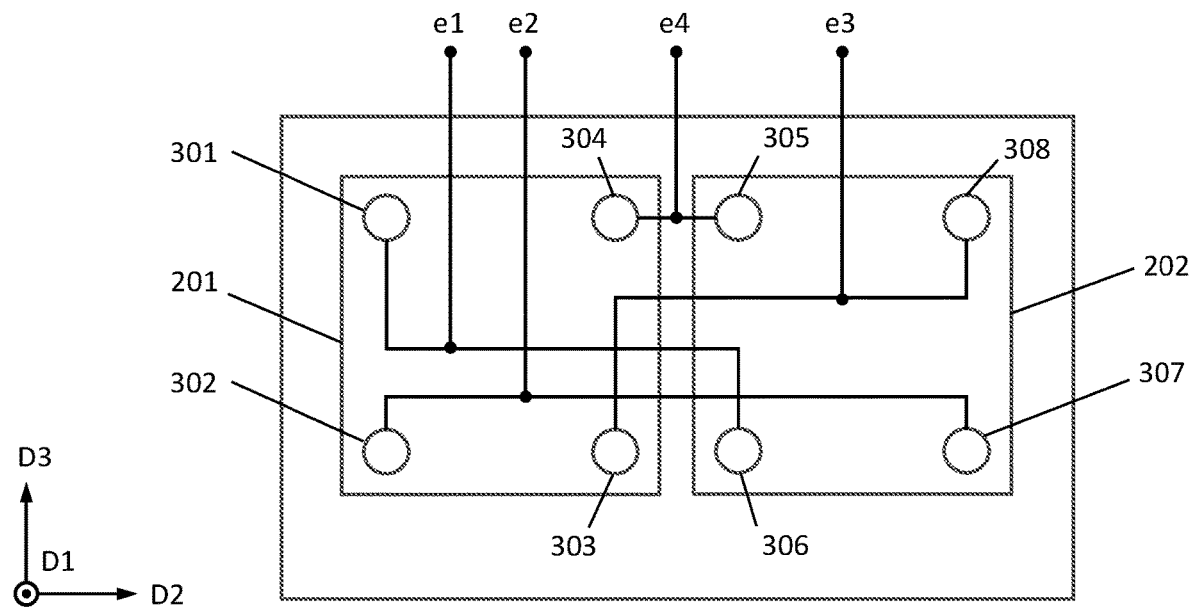
FIG. 18 is a structural view of a first sensing portion of a current detection apparatus according to an embodiment of the present disclosure.
Figure 19:
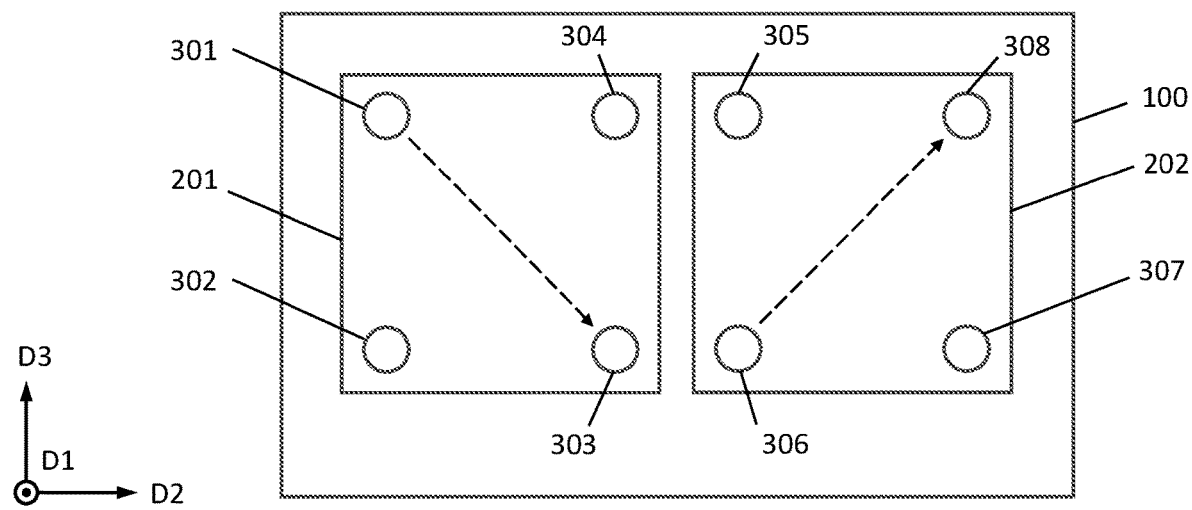
FIG. 19 is a structural view of a first sensing portion of another current detection apparatus according to an embodiment of the present disclosure.

FIG. 18 is a structural view of a first sensing portion A of a current detection apparatus according to an embodiment of the present disclosure. FIG. 19 is a structural view of a first sensing portion A of another current detection apparatus according to an embodiment of the present disclosure. On the basis of the preceding embodiments and with reference to FIG. 18, the first sensing portion A provided in the embodiment of the present disclosure may include at least two Hall cells connected to each other. The Hall cells of the first sensing portion A are configured as follows: in a same drive current direction, a positive electrode of a Hall voltage output terminal of an odd-numbered Hall cell and a negative electrode of a Hall voltage output terminal of an even-numbered Hall cell are connected as the second contact e2; a negative electrode of the Hall voltage output terminal of the odd-numbered Hall cell and a positive electrode of the Hall voltage output terminal of the even-numbered Hall cell are connected as the fourth contact e4. The number of Hall cells is an even number.

The second sensing portion B and the first sensing portion A provided in the embodiment of the present disclosure are of a same structure. In an embodiment, with reference to FIG. 14, FIG. 18 and FIG. 19, the first sensing portion A may include a first Hall cell 201 and a second Hall cell 202. The first Hall cell 201 includes a first electrode 301, a second electrode 302, a third electrode 303 and a fourth electrode 304. The second Hall cell 202 includes a fifth electrode 305, a sixth electrode 306, a seventh electrode 307 and an eighth electrode 308. The first Hall cell 201 and the second Hall cell 202 are connected in parallel. The first electrode 301 and the sixth electrode 306 are electrically connected to the first contact e1. The second electrode 302 and the seventh electrode 307 are connected to the second contact e2. The third electrode 303 and the eighth electrode 308 are connected to the third contact e3. The fourth electrode 304 and the fifth electrode 305 are connected to the fourth contact e4. The second electrode 302 and the fifth electrode 305 are positive electrodes of Hall voltage output terminals. The fourth electrode 304 and the seventh electrode 307 are negative electrodes of Hall voltage output terminals.

With reference to FIG. 18 and FIG. 19, the first connection mode forms a first working state: the first contact e1 is connected to the power supply, the third contact e3 is connected to the ground, the average current direction in the first Hall cell 201 is from the first electrode 301 to the third electrode 303, the average current direction in the second Hall cell 202 is from the sixth electrode 306 to the eighth electrode 308, and the second contact e2 and the fourth contact e4 are signal output terminals to generate a first output.

Similarly, the second connection mode forms a second working state: the second contact e2 is connected to the power supply, the fourth contact e4 is connected to the ground, the average current direction in the first Hall cell is from the second electrode 302 to the fourth electrode 304, the average current direction in the second Hall cell is from the seventh electrode 307 to the fifth electrode 305, and the third contact e3 and the first contact e1 are signal output terminals to generate a second output.

Similarly, the third connection mode forms a third working state: the third contact e3 is connected to the power supply, the first contact e1 is connected to the ground, the average current direction in the first Hall cell is from the third electrode 303 to the first electrode 301, the average current direction in the second Hall cell is from the eighth electrode 308 to the sixth electrode 306, and the fourth contact e4 and the second contact e2 are signal output terminals to generate a third output.

Similarly, the fourth connection mode forms a fourth working state: the fourth contact e4 is connected to the power supply, the second contact e2 is connected to the ground, the average current direction in the first Hall cell is from the fourth electrode 304 to the second electrode 302, the average current direction in the second Hall cell is from the fifth electrode 305 to the seventh electrode 307, and the first contact e1 and the third contact e3 are signal output terminals to generate a fourth output.

On the basis of the preceding embodiments and with reference to FIG. 10, FIG. 14 and FIG. 15, the first sensing portion A and the second sensing portion B provided in the embodiment of the present disclosure are of a same structure. Hall cells of the second sensing portion B are configured as follows: in a same drive current direction, a positive electrode of a Hall voltage output terminal of an odd-numbered Hall cell and a negative electrode of a Hall voltage output terminal of an even-numbered Hall cell are connected as the seventh contact e7; and a negative electrode of the Hall voltage output terminal of the odd-numbered Hall cell and a positive electrode of the Hall voltage output terminal of the even-numbered Hall cell are connected as the fifth contact e5.

The second sensing portion B may include a first Hall cell 201 and a second Hall cell 202. The first Hall cell 201 and the second Hall cell 202 of the second sensing portion B are configured as follows: in a same drive current direction, a positive electrode of a Hall voltage output terminal of the first Hall cell 201 and a negative electrode of a Hall voltage output terminal of the second Hall cell 202 are connected to the seventh contact e7. A negative electrode of the Hall voltage output terminal of the first Hall cell 201 and a positive electrode of the Hall voltage output terminal of the second Hall cell 202 are connected to the fifth contact e5.

Figure 20:
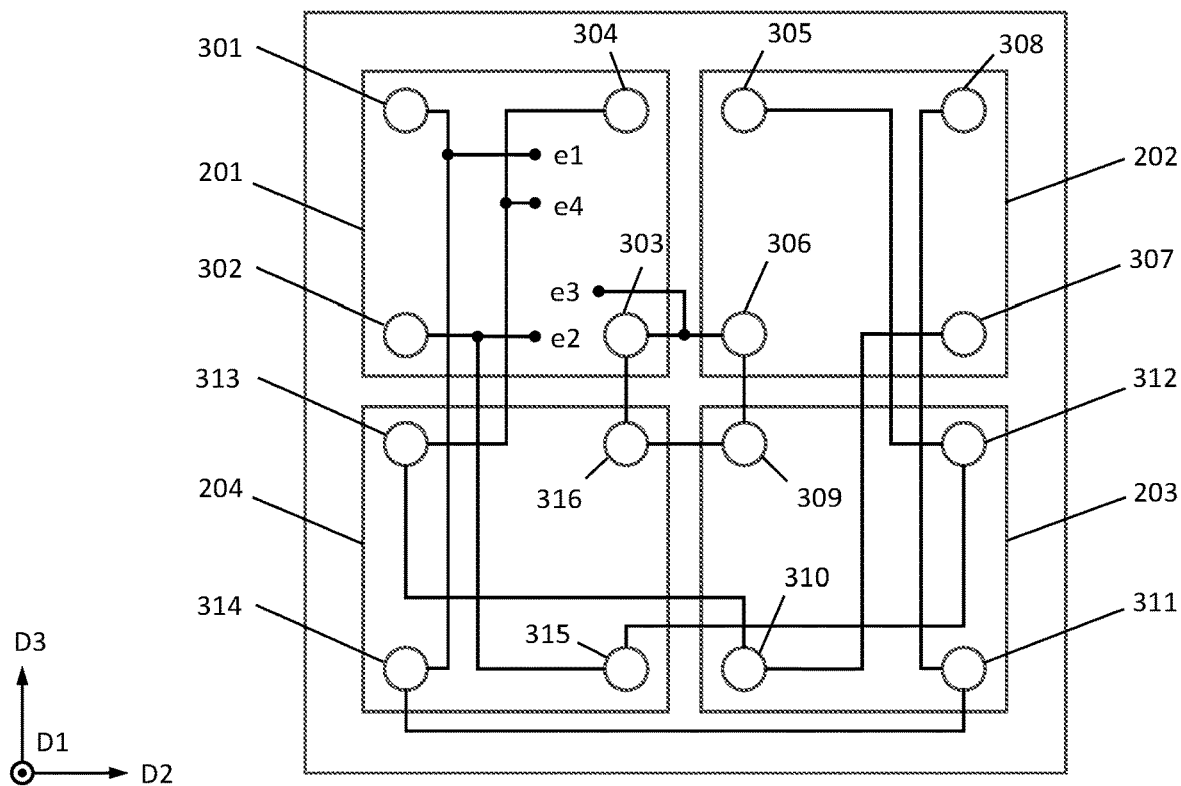
FIG. 20 is a structural view of a first sensing portion of another current detection apparatus according to an embodiment of the present disclosure.
Figure 21:
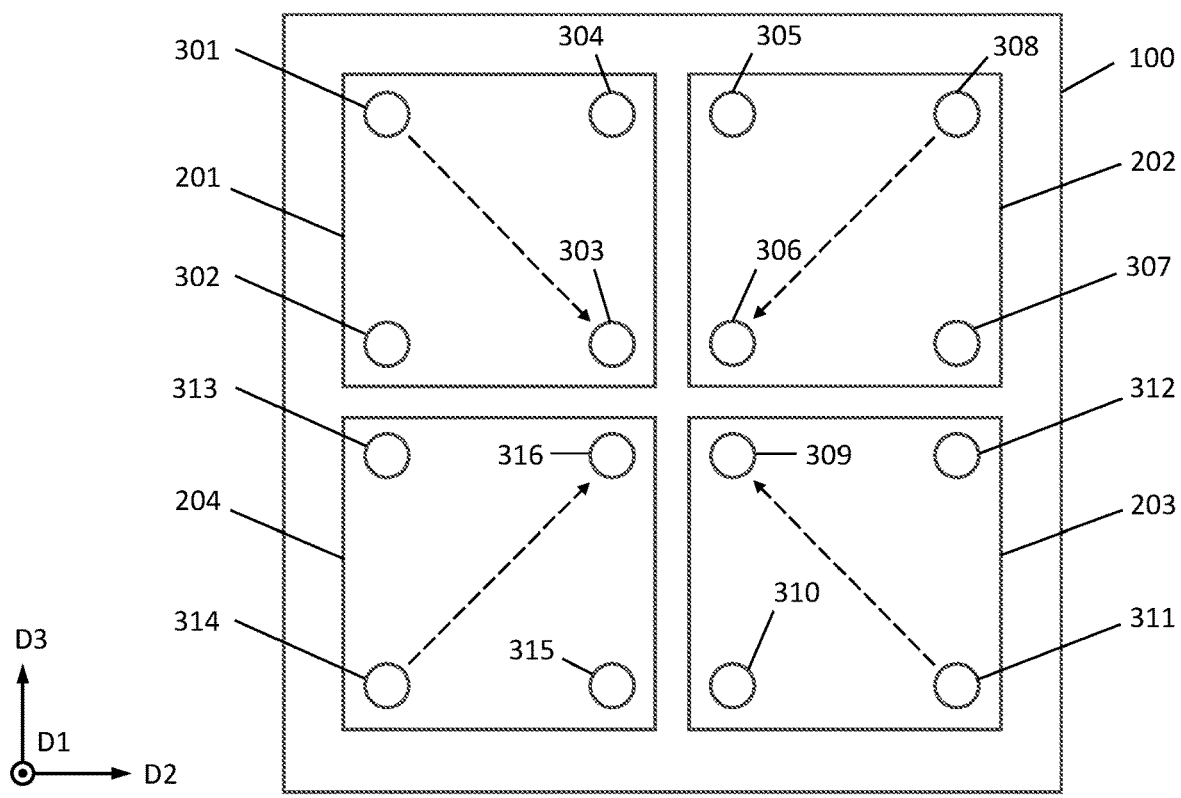
FIG. 21 is a structural view of a first sensing portion of another current detection apparatus according to an embodiment of the present disclosure.

FIG. 20 is a structural view of a first sensing portion A of another current detection apparatus according to an embodiment of the present disclosure. FIG. 21 is a structural view of a first sensing portion A of another current detection apparatus according to an embodiment of the present disclosure. On the basis of the preceding embodiments and with reference to FIG. 20 and FIG. 21, the first sensing portion A of the magnetic sensor 10 is formed by a first Hall cell 201, a second Hall cell 202, a third Hall cell 203 and a fourth Hall cell 204 which are connected in parallel. The first Hall cell 201 has four electrodes, that is, a first electrode 301, a second electrode 302, a third electrode 303 and a fourth electrode 304. The second Hall cell 202 has four electrodes, that is, a fifth electrode 305, a sixth electrode 306, a seventh electrode 307 and an eighth electrode 308. The third Hall cell 203 has four electrodes, that is, a ninth electrode 309, a tenth electrode 310, an eleventh electrode 311 and a twelfth electrode 312. The fourth Hall cell 204 has four electrodes, that is, a thirteenth electrode 313, a fourteenth electrode 314, a fifteenth electrode 315 and a sixteenth electrode 316. The first electrode 301, the eighth electrode 308, the eleventh electrode 311 and the fourteenth electrode 314 are connected to form the first contact e1. The second electrode 302, the fifth electrode 305, the twelfth electrode 312 and the fifteenth electrode 315 are connected to form the second contact e2. The third electrode 303, the sixth electrode 306, the ninth electrode 309 and the sixteenth electrode 316 are connected to form the third contact e3. The fourth electrode 304, the seventh electrode 307, the tenth electrode 310 and the thirteenth electrode 313 are connected to form the fourth contact e4. As shown in FIG. 14, the first contact e1, the second contact e2, the third contact e3 and the fourth contact e4 are the four contacts of the first sensing portion A of the magnetic sensor 10 and are connected to the first drive terminal P1, the second output terminal P4, the second drive terminal P3 and the first output terminal P2, respectively.

FIG. 21 exemplarily illustrates the first connection mode shown in FIG. 20. With reference to FIG. 20 and FIG. 21, the first connection mode forms a first working state: the first contact e1 is connected to the power supply, the third contact e3 is connected to the ground, the average current direction in the first Hall cell 201 is from the first electrode 301 to the third electrode 303, the average current direction in the second Hall cell 202 is from the eighth electrode 308 to the sixth electrode 306, the average current direction in the third Hall cell 203 is from the eleventh electrode 311 to the ninth electrode 309, the average current direction in the fourth Hall cell 204 is from the fourteenth electrode 314 to the sixteenth electrode 316, and the second contact e2 and the fourth contact e4 are signal output terminals to generate a first output.

Similarly, with reference to FIG. 20 and FIG. 21, the second connection mode forms a second working state: the second contact e2 is connected to the power supply, the fourth contact e4 is connected to the ground, the average current direction in the first Hall cell 201 is from the second electrode 302 to the fourth electrode 304, the average current direction in the second Hall cell 202 is from the fifth electrode 305 to the seventh electrode 307, the average current direction in the third Hall cell 203 is from the twelfth electrode 312 to the tenth electrode 310, the average current direction in the fourth Hall cell 204 is from the fifteenth electrode 315 to the thirteenth electrode 313, and the third contact e3 and the first contact e1 are signal output terminals to generate a second output.

Similarly, with reference to FIG. 20 and FIG. 21, the third connection mode forms a third working state: the third contact e3 is connected to the power supply, the first contact e1 is connected to the ground, the average current direction in the first Hall cell 201 is from the third electrode 303 to the fifth electrode 301, the average current direction in the second Hall cell 202 is from the sixth electrode 306 to the eighth electrode 308, the average current direction in the third Hall cell 203 is from the ninth electrode 309 to the eleventh electrode 311, the average current direction in the fourth Hall cell 204 is from the sixteenth electrode 316 to the fourteenth electrode 314, and the fourth contact e4 and the second contact e2 are signal output terminals to generate a third output.

Similarly, with reference to FIG. 20 and FIG. 21, the fourth connection mode forms a fourth working state: the fourth contact e4 is connected to the power supply, the second contact e2 is connected to the ground, the average current direction in the first Hall cell 201 is from the fourth electrode 304 to the second electrode 302, the average current direction in the second Hall cell 202 is from the seventh electrode 307 to the fifth electrode 305, the average current direction in the third Hall cell 203 is from the tenth electrode 310 to the twelfth electrode 312, the average current direction in the fourth Hall cell 204 is from the thirteenth electrode 313 to the fifteenth electrode 315, and the first contact e1 and the third contact e3 are signal output terminals to generate a fourth output.

Figure 22:
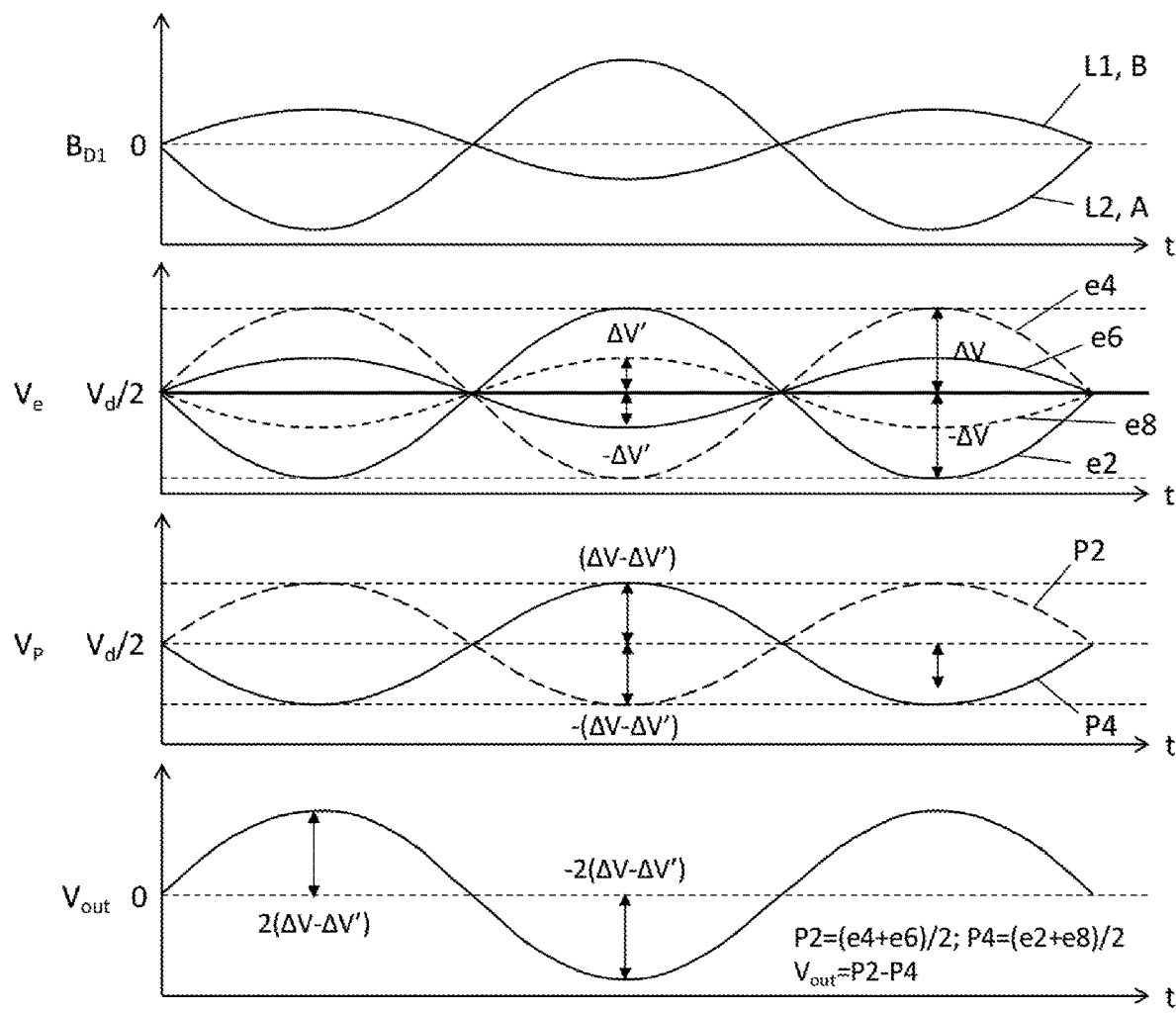
FIG. 22 is an output waveform diagram of a magnetic sensor of the current detection apparatus as shown in FIG. 4 detecting a current by using magnetic field variations in the D1 direction according to an embodiment of the present disclosure.

In an optional application scenario, FIG. 22 is an output waveform diagram of a magnetic sensor 10 of the current detection apparatus as shown in FIG. 4 detecting a current I by using magnetic field variations in the D1 direction according to an embodiment of the present disclosure. With reference to FIG. 4, FIG. 5, FIG. 16 and FIG. 22, a magnetic field component of the first signal magnetic field Bh is generated when a positive current I is introduced from w1 into the conductor W and derived from w2. The direction of the magnetic field component of the first signal magnetic field Bh is clockwise around the terminal w1 and counter-clockwise around the terminal w2. With such magnetic distribution, magnetic field components in the −D2 direction and in the +D1 direction are generated at the second position L1, and the current I generates a magnetic field component in the −D1 direction at the first position L2. The first part A of the magnetic sensor 10 has merely the magnetic field component in the −D1 direction and the second part B has a magnetic field component in the +D1 direction. Therefore, in this case, best performance of the apparatus can be obtained by the use of the planar Hall magnetic sensor 10.

In the case where the sensitive direction of the magnetic sensor 10 is perpendicular to the plane of the substrate S, for example, is in the D1 direction as shown in FIG. 4, in the configuration shown in FIG. 4, the magnetic sensor 10 generates an output merely for the component of the first signal magnetic field in the D1 direction, and the relationship between the output characteristic and the component of the signal magnetic field in the D1 direction is as shown in FIG. 22. In the case where the current I passes through the conductor W and varies in magnitude with time as shown in the above figure of FIG. 16, the variation of the magnetic field component $B_{D1}$ of the first signal magnetic field in strength at the first position L2 is opposite to the variation of the current in phase, as shown in the first figure of FIG. 22, the variation of the magnetic field component Bpi in strength at the second position L1 is the same as the variation of the current I in phase, and the amplitude at the second position L1 is less than the amplitude at the first position L2, as shown in the first figure of FIG. 22.

As shown in the second figure of FIG. 22, the variation in phase of the potential of the second contact e2 of the first sensing portion A at the first position L2 of the magnetic sensor 10 is the same as the variation in phase of the magnetic field component B D1 of the first signal magnetic field in the D1 direction of the second sensing portion B at the second position L1, and the variation amplitude is +/−ΔV. The variation in phase of the potential of the fourth contact e4 of the first sensing portion A is opposite to the variation in phase of the magnetic field component $B_{D1}$ of the first signal magnetic field in the D1 direction at the first position L2, and the variation amplitude is also +/−ΔV. The variation in phase of the potential of the sixth contact e6 of the second sensing portion B of the magnetic sensor 10 is the same as the variation in phase of the magnetic field component $B_{D1}$ of the first signal magnetic field in the D1 direction at the second position L1, and the variation amplitude is +/−ΔV'. The variation in phase of the potential of the eighth contact e8 of the second sensing portion B is opposite to the variation in phase of the magnetic field component $B_{D1}$ of the first signal magnetic field in the D1 direction at the second position L1, the variation amplitude is also +/−ΔV', and ΔV>ΔV'.

As shown in the third figure of FIG. 22, the sensing electrical signal output from the first output terminal P2 is a voltage of (e4+e6)/2, and the amplitude of the sensing electrical signal output from the first output terminal P2 is (ΔV'−ΔV). The sensing electrical signal output from the second output terminal P4 is a voltage of (e2+e8)/2, and the amplitude of the sensing electrical signal output from the first output terminal P2 is (ΔV−ΔV'). As shown in the fourth figure of FIG. 22, the overall output sensing electrical signal $V_{out}$ of the magnetic sensor 10 is a voltage of (P2−P4), and the amplitude of the overall output sensing electrical signal of the magnetic sensor 10 is 2×(ΔV−ΔV') in an output waveform.

Figure 23:
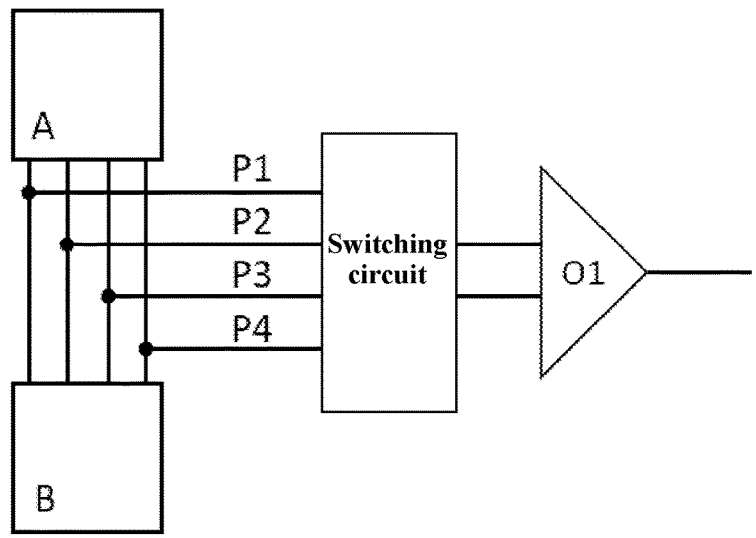
FIG. 23 is a structural view of another current detection apparatus according to an embodiment of the present disclosure.

FIG. 23 is a structural view of another current detection apparatus according to an embodiment of the present disclosure. FIG. 24 is a structural view of another current detection apparatus according to an embodiment of the present disclosure. On the basis of the preceding embodiments and with reference to FIG. 23 and FIG. 24, the current detection apparatus provided in the embodiment of the present disclosure further includes at least one switching circuit arranged on the substrate. The switching circuit is electrically connected to the output terminals of the magnetic sensor 10, is configured to switch a connection mode of the output terminals of the magnetic sensor 10 so as to adjust a working state of the magnetic sensor 10, and is configured to sequentially drive the magnetic sensor 10 to output the first sensing electrical signal and the second sensing electrical signal in the first signal magnetic field. Preferably, the at least one magnetic sensor 10 is arranged in one-to-one correspondence with the at least one switching circuit.

The switching circuit may switch a connection mode of the output terminals of the magnetic sensor 10 so as to adjust the working state of the magnetic sensor 10 and may sequentially drive the magnetic sensor 10 to output the first sensing electrical signal and the second sensing electrical signal in the first signal magnetic field.

With reference to FIG. 23, the first sensing portion A and the second sensing portion B of the magnetic sensor 10 are connected to each other through wires to form output terminals, that is, a first drive terminal P1, a first output terminal P2, a second drive terminal P3 and a second output terminal P4. The four output terminals are connected to a switching circuit. Through contact switching of the switching circuit, the first connection mode to the fourth connection mode of the magnetic sensor 10 can be sequentially formed, and the magnetic sensor 10 can be driven to sequentially generate a first output, a second output, a third output and a fourth output. The first connection mode is as follows: the first drive terminal P1 is connected to a power supply, the second drive terminal P3 is connected to the ground, and the first output terminal P2 and the second output terminal P4 are signal output terminals. The second connection mode is as follows: the second output terminal P4 is connected to the power supply, the first output terminal P2 is connected to the ground, and the second drive terminal P3 and the first drive terminal P1 are signal output terminals. The third connection mode is as follows: the second drive terminal P3 is connected to the power supply, the contact of the first drive terminal P1 is connected to the ground, and the second output terminal P4 and the first output terminal P2 are signal output terminals. The fourth connection mode is as follows: the first output terminal P2 is connected to the power supply, the second output terminal P4 is connected to the ground, and the first drive terminal P1 and the second drive terminal P3 are signal output terminals.

With reference to FIG. 24, FIG. 24 exemplarily shows a case where the current detection apparatus includes two magnetic sensors 10, that is, a first magnetic sensor 10 and a second magnetic sensor 10. The first sensing portion A and the second sensing portion B of the first magnetic sensor 10 are connected to each other through wires to form four output terminals, that is, the first drive terminal P1, the first output terminal P2, the second drive terminal P3 and the second output terminal P4 which are four contacts. The first drive terminal P1, the first output terminal P2, the second drive terminal P3 and the second output terminal P4 are connected to a switching circuit. Through output terminal switching of the switching circuit, the first connection mode to the fourth connection mode of the magnetic sensor 10 can be sequentially formed, and the magnetic sensor 10 can be driven to sequentially generate a first output to a fourth output. The third sensing portion C and the fourth sensing portion D of the second magnetic sensor 10 are connected to each other through wires to form four output terminals. The four output terminals are a third drive terminal P5, a third output terminal P6, a fourth drive terminal P7 and a fourth output terminal P8. The third drive terminal P5, the third output terminal P6, the fourth drive terminal P7 and the fourth output terminal P8 are connected to another switching circuit. Through output terminal switching of the switching circuit, the fifth connection mode to the eighth connection mode of the magnetic sensor 10 can be sequentially formed, and the magnetic sensor 10 can be driven to sequentially generate a fifth output to an eighth output.

On the basis of the preceding embodiments and with reference to FIG. 23 and FIG. 24, the current detection apparatus provided in the embodiment of the present disclosure may further include an amplifying module. The amplifying module is connected between the switching circuit and the processing circuit 20, is configured to receive a first sensing electrical signal and a second sensing electrical signal, perform differential amplification on the first sensing electrical signal and the second sensing electrical signal, and output the amplified sensing electrical signals to the processing circuit 20

With reference to FIG. 24, the amplification module may include a first differential operational amplifier 01 and a second differential operational amplifier 02. The current detection apparatus includes the first magnetic sensor 10 and the second magnetic sensor 10. An output terminal of the first magnetic sensor 10 is connected to the first differential operational amplifier 01. The sensing electrical signal output from the first magnetic sensor 10 is amplified by the first differential operational amplifier 01 and input into the processing circuit 20.

An output terminal of the second magnetic sensor 10 is connected to the second differential operational amplifier 02. The sensing electrical signal output from the second magnetic sensor 10 is amplified by the second differential operational amplifier 02 and input into the processing circuit 20. The processing circuit 20 may perform functions such as multipole amplification, signal sampling, signal operation such as multiple sampling addition or averaging, and various calibration such as temperature calibration, zero drift calibration and ripple removal, and output current detection values. With such arrangement, the current detection accuracy of the current detection apparatus is further improved, and the anti-electromagnetic interference ability of the current detection apparatus is improved.

FIG. 25 is a flowchart of a current detection method according to an embodiment of the present disclosure. On the basis of the preceding embodiments and with reference to FIG. 1 to FIG. 3 and FIG. 25, the current detection method provided in the embodiment of the present disclosure is applied to the current detection apparatus provided in any preceding embodiment. The current detection apparatus provided in the embodiment of the present disclosure includes a substrate S, at least one magnetic sensor 10 arranged on the substrate S, and a processing circuit 20. The processing circuit 20 is connected to the magnetic sensor 10. The magnetic sensor 10 includes a first sensing portion A and a second sensing portion B. The first sensing portion A and the second sensing portion B are different in a direction of a magnetic field component of the first signal magnetic field Bh.

The current detection method provided in the embodiment of the present disclosure includes the steps described below.

In S2501, a conductor is arranged in a preset detection area corresponding to the current detection apparatus. A first signal magnetic field is generated when a current passes through the conductor.

In S2502, the magnetic sensor generates a sensing electrical signal according to the first signal magnetic field generated when the current flows through the conductor. The magnetic sensor has no signal output for a second magnetic field, and the second magnetic field includes a uniform magnetic field outside the conductor.

In S2503, the processing circuit determines, according to the sensing electrical signal, a value of the current flowing through the conductor.

According to the current detection method provided in the embodiment of the present disclosure, the conductor is arranged in the preset detection area corresponding to the current detection apparatus, the magnetic sensor generates the sensing electrical signal according to the first signal magnetic field generated when the current flows through the conductor, and the processing circuit determines, according to the sensing electrical signal, the value of the current flowing through the conductor. With such arrangement, the magnetic sensor outputs the sensing electrical signal merely for the first signal magnetic field and does not output a sensing electrical signal for the second magnetic field, thereby better eliminating the interference of the uniform magnetic field outside the conductor and improving the detection accuracy of the current flowing through the conductor. Additionally, the current detection apparatus adopted for the current detection method provided in the embodiment of the present disclosure has simple structure, low cost and good practicability.

It is to be understood that various forms of the preceding flows may be used with steps reordered, added, or deleted. For example, the steps described in the present disclosure may be performed in parallel, in sequence, or in a different order as long as the desired result of the technical solutions provided in the present disclosure can be achieved. The execution sequence of these steps is not limited herein.

The scope of the present disclosure is not limited to the preceding embodiments. It is to be understood by those skilled in the art that various modifications, combinations, subcombinations, and substitutions may be made according to design requirements and other factors. Any modification, equivalent substitution, improvement and the like made within the spirit and principle of the present disclosure fall within the scope of the present disclosure.

What is claimed is:

1. A current detection apparatus, wherein a conductor is configured in a preset detection area corresponding to the current detection apparatus; and a first signal magnetic field is generated when a current passes through the conductor; and wherein the current detection apparatus comprises:
   a substrate;
   at least one magnetic sensor arranged on the substrate, wherein a magnetic sensor of the at least one magnetic sensor comprises a first sensing portion and a second sensing portion, and the first sensing portion and the second sensing portion are different in a direction of a magnetic field component of the first signal magnetic field, wherein the magnetic sensor is configured to generate a sensing electrical signal according to the first signal magnetic field; and
   a processing circuit connected to the magnetic sensor and configured to determine, according to the sensing electrical signal, a value of the current;
   wherein the magnetic sensor further comprises: a plurality of first connection lines and a plurality of output terminals; the first sensing portion and the second sensing portion are connected in parallel through the plurality of first connection lines, and each of the plurality of first connection lines is connected to one of the plurality of output terminals;
   wherein the plurality of output terminals of the magnetic sensor comprises: a first output terminal configured to output a first sensing electrical signal of the magnetic sensor and a second output terminal configured to output a second sensing electrical signal of the magnetic sensor; and under the first signal magnetic field, the first sensing electrical signal and the second sensing electrical signal have different amplitude variations and phase variations;
   wherein the current detection apparatus further comprises: at least one switching circuit arranged on the substrate; a switching circuit of the at least one switching circuit is electrically connected to the plurality of output terminals of the magnetic sensor, is configured to switch a connection mode of the plurality of output terminals of the magnetic sensor to adjust a working state of the magnetic sensor, and is configured to sequentially drive the magnetic sensor to output the first sensing electrical signal and the second sensing electrical signal under the first signal magnetic field.

2. The current detection apparatus of claim 1, wherein
the substrate has a first surface facing the conductor and a second surface facing away from the conductor;
the substrate comprises a first position and a second position which are spaced apart on the first surface or the second surface;
the first sensing portion is arranged at the first position; the second sensing portion is arranged at the second position;
the magnetic sensor senses the first signal magnetic field;
a direction of the first signal magnetic field at the first position is different from a direction of the first signal magnetic field at the second position;
strength of the first signal magnetic field at the first position is different from strength of the first signal magnetic field at the second position; and
the magnetic sensor generates the sensing electrical signal according to a difference between magnetic field strength of a component of the first signal magnetic field in a preset direction at the first position and magnetic field strength of a component of the first signal magnetic field in the preset direction at the second position.

3. The current detection apparatus of claim 1, wherein the conductor at least partially overlaps an orthographic projection of the first sensing portion on the conductor and/or an orthographic projection of the second sensing portion on the conductor; or the conductor does not overlap an orthographic projection of the first sensing portion on the conductor or an orthographic projection of the second sensing portion on the conductor.

4. The current detection apparatus of claim 1, wherein along an extension direction of the first sensing portion pointing to the second sensing portion, the magnetic sensor crosses an extension direction of the conductor.

5. The current detection apparatus of claim 4, wherein, along the extension direction of the first sensing portion pointing to the second sensing portion, the magnetic sensor is perpendicular to the extension direction of the conductor.

6. The current detection apparatus of claim 1, wherein the plurality of output terminals of the magnetic sensor further comprises: a first drive terminal and a second drive terminal, wherein the first drive terminal is configured to be connected to a power supply and the second drive terminal is configured to be grounded; or, the first drive terminal is configured to be grounded and the second drive terminal is configured to be connected to a power supply;

the first sensing portion comprises a first contact, a second contact, a third contact and a fourth contact;

the second sensing portion comprises a fifth contact, a sixth contact, a seventh contact and an eighth contact;

the first contact and the fifth contact are connected as the first drive terminal;

the second contact and the eighth contact are connected as the second output terminal;

the third contact and the seventh contact are connected as the second drive terminal; and the fourth contact and the sixth contact are connected as the first output terminal.

7. The current detection apparatus of claim 6, wherein the first sensing portion comprises:

at least two Hall cells connected to each other and configured as follows:

in a same drive current direction, a positive electrode of a Hall voltage output terminal of an odd-numbered Hall cell and a negative electrode of a Hall voltage output terminal of an even-numbered Hall cell are connected as the second contact; and a negative electrode of the Hall voltage output terminal of the odd-numbered Hall cell and a positive electrode of the Hall voltage output terminal of the even-numbered Hall cell are connected as the fourth contact;

wherein a number of Hall cells is an even number.

8. The current detection apparatus of claim 7, wherein the second sensing portion and the first sensing portion are of a same structure;

Hall cells of the second sensing portion are configured as follows:

in a same drive current direction, a positive electrode of a Hall voltage output terminal of an odd-numbered Hall cell and a negative electrode of a Hall voltage output terminal of an even-numbered Hall cell are connected as the seventh contact; and a negative electrode of the Hall voltage output terminal of the odd-numbered Hall cell and a positive electrode of the Hall voltage output terminal of the even-numbered Hall cell are connected as the fifth contact.

9. The current detection apparatus of claim 8, wherein the first sensing portion and the second sensing portion are of the same structure;

the first sensing portion comprises a first Hall cell and a second Hall cell;

the first Hall cell comprises a first electrode, a second electrode, a third electrode and a fourth electrode;

the second Hall cell comprises a fifth electrode, a sixth electrode, a seventh electrode and an eighth electrode; and the first electrode and the sixth electrode are electrically connected to the first contact, the second electrode and the seventh electrode are connected to the second contact, the third electrode and the eighth electrode are connected to the third contact, and the fourth electrode and the fifth electrode are connected to the fourth contact;

wherein the second electrode and the fifth electrode are positive electrodes of Hall voltage output terminals; and the fourth electrode and the seventh electrode are negative electrodes of Hall voltage output terminals.

10. The current detection apparatus of claim 1, wherein the at least one magnetic sensor is arranged in one-to-one correspondence with the at least one switching circuit.

11. The current detection apparatus of claim 1, further comprising:

an amplifying module, wherein the amplifying module is connected between the switching circuit and the processing circuit and is configured to receive the first sensing electrical signal and the second sensing electrical signal, perform differential amplification on the first sensing electrical signal and the second sensing electrical signal, and output the amplified sensing electrical signals to the processing circuit.

12. The current detection apparatus of claim 1, wherein a sensitive direction of the magnetic sensor is parallel to a plane where the substrate is disposed; or a sensitive direction of the magnetic sensor is perpendicular to a plane where the substrate is disposed.

13. A current detection method, applied to a current detection apparatus comprising a substrate, at least one magnetic sensor arranged on the substrate, and a processing circuit connected to the at least one magnetic sensor; wherein a magnetic sensor comprises a first sensing portion and a second sensing portion, and the first sensing portion and the second sensing portion are different in a direction of a magnetic field component of a first signal magnetic field, wherein the first signal magnetic field is generated when a current passes through a conductor in a preset detection area corresponding to the current detection apparatus;

wherein the magnetic sensor further comprises: a plurality of first connection lines and a plurality of output terminals; the first sensing portion and the second sensing portion are connected in parallel through the plurality of first connection lines, and each of the plurality of first connection lines is connected to one of the plurality of output terminals;

wherein the plurality of output terminals of the magnetic sensor comprises: a first output terminal configured to output a first sensing electrical signal of the magnetic sensor and a second output terminal configured to output a second sensing electrical signal of the magnetic sensor; and under the first signal magnetic field, the first sensing electrical signal and the second sensing electrical signal have different amplitude variations and phase variations;

wherein the current detection apparatus further comprises: at least one switching circuit arranged on the substrate; a switching circuit of the at least one switching circuit is electrically connected to the plurality of output terminals of the magnetic sensor, is configured to switch a connection mode of the plurality of output terminals of the magnetic sensor to adjust a working state of the magnetic sensor, and is configured to sequentially drive the magnetic sensor to output the first sensing electrical signal and the second sensing electrical signal under the first signal magnetic field; and the current detection method comprises:

generating, by the magnetic sensor, a sensing electrical signal according to the first signal magnetic field; and determining, by the processing circuit according to the sensing electrical signal, a value of the current.

* * * * *